(12) United States Patent
Schmitt et al.

(10) Patent No.: US 7,701,381 B2
(45) Date of Patent: Apr. 20, 2010

(54) SYSTEM AND METHOD OF ORBITAL ANGULAR MOMENTUM (OAM) DIVERSE SIGNAL PROCESSING USING CLASSICAL BEAMS

(75) Inventors: Harry A. Schmitt, Tucson, AZ (US); Donald E. Waagen, Tucson, AZ (US); Nitesh N. Shah, Tucson, AZ (US); Delmar L. Barker, Tucson, AZ (US); Andrew D. Greentree, Fawkner (AU)

(73) Assignee: Raytheon Company, Waltham, MA (US)

( * ) Notice: Subject to any disclaimer, the term of this patent is extended or adjusted under 35 U.S.C. 154(b) by 30 days.

(21) Appl. No.: 12/198,400

(22) Filed: Aug. 26, 2008

(65) Prior Publication Data

US 2010/0013696 A1   Jan. 21, 2010

Related U.S. Application Data

(60) Provisional application No. 61/081,802, filed on Jul. 18, 2008.

(51) Int. Cl.
G01S 13/74 (2006.01)
(52) U.S. Cl. ............ 342/42; 340/572.2; 340/572.7
(58) Field of Classification Search ............ 342/42
See application file for complete search history.

(56) References Cited

U.S. PATENT DOCUMENTS 5,982,329 A   11/1999   Pittman

| | | | |
|---|---|---|---|
| 2003/0137645 A1* | 7/2003 | Fluckiger | 356/4.01 |
| 2005/0259914 A1* | 11/2005 | Padgett et al. | 385/16 |
| 2007/0053034 A1* | 3/2007 | Payne | 359/31 |
| 2007/0096912 A1* | 5/2007 | Rajan | 340/572.3 |
| 2008/0017812 A1* | 1/2008 | Dandurand | 250/503.1 |
| 2008/0048905 A1* | 2/2008 | McEwan | 342/21 |
| 2009/0231104 A1* | 9/2009 | Kofman et al. | 340/10.1 |

OTHER PUBLICATIONS

Brand et al., Millilmeter-Wave Beams with Phase Singularities, IEEE Transactions on Microwave Theory and Techniques, vol. 46, No. 7, Jul. 1998, pp. 948-951.
Molina-Terriza et al., Twisted Photons, Nature Publishing Group, vol. 3, May 2007, pp. 305-310.
Molina-Terriza et al., Twisted photons, Nature Physics, Nature Publishing Group, London, GB, vol. 3, May 1, 2007, pp. 305-310.

(Continued)

*Primary Examiner*—Thomas H Tarcza
*Assistant Examiner*—Timothy A Brainard
(74) *Attorney, Agent, or Firm*—Eric A. Gifford

(57) ABSTRACT

The present invention describes a system and method of OAM diverse signal processing using classical beams for applications in which OAM signal character is controlled such as optical tagging and applications in which OAM signal character is not controlled such as clutter mitigation and interference cancellation for target detection, identification etc. This is accomplished by transmitting a source beam having a prescribed state with one or more non-zero OAM components, reflecting the beam off a 'tagged' or 'untagged' target and receiving the return beam in the direct return path to measure the one or more OAM components to identify the target. OAM processing provides additional degrees of processing freedom to greatly enhance the processing capabilities to detect and identify both 'tagged' and 'untagged' targets.

29 Claims, 17 Drawing Sheets

OTHER PUBLICATIONS

Brand, Fergus, Millimeter-wave beams with phase singularities, IEEE Transactions on Microwave Theory and Techniques, vol. 46, No. 7, Jul. 1, 1998, pp. 948-951.

Brand, Fergus, Phase singularities in beams, American Journal of Physics, American Associate of Physics Teachers, vol. 67, No. 1, Jan. 1, 1999, pp. 55-60.

* cited by examiner

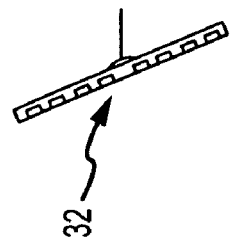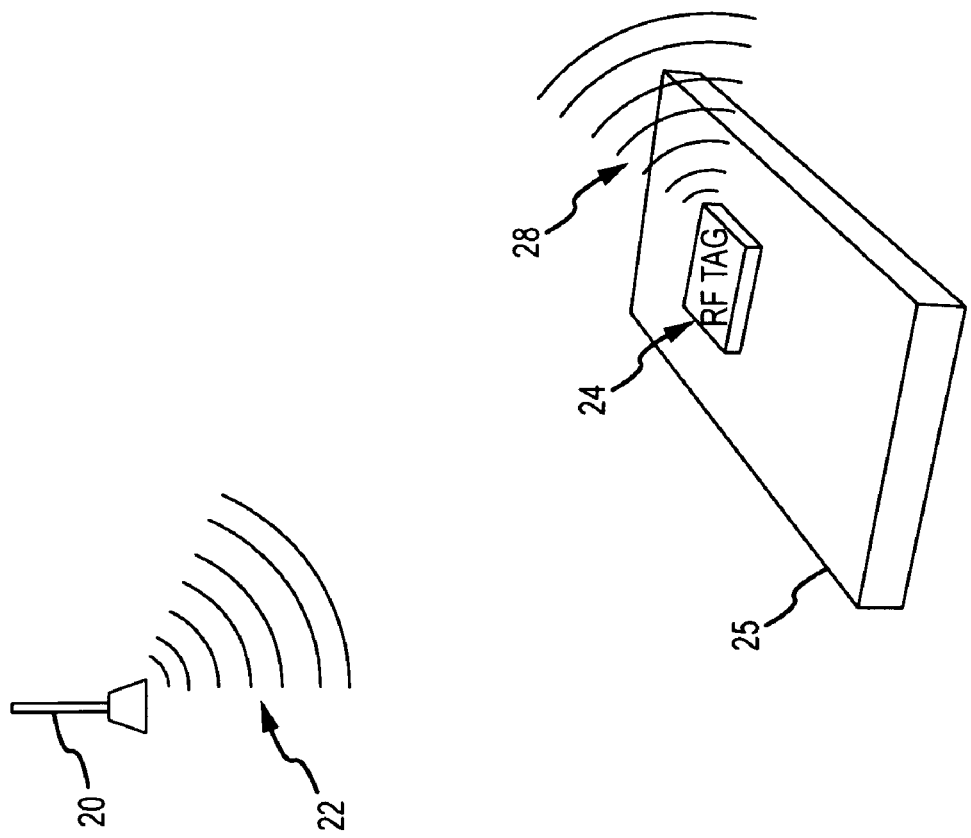
FIG. 2
(PRIOR ART)

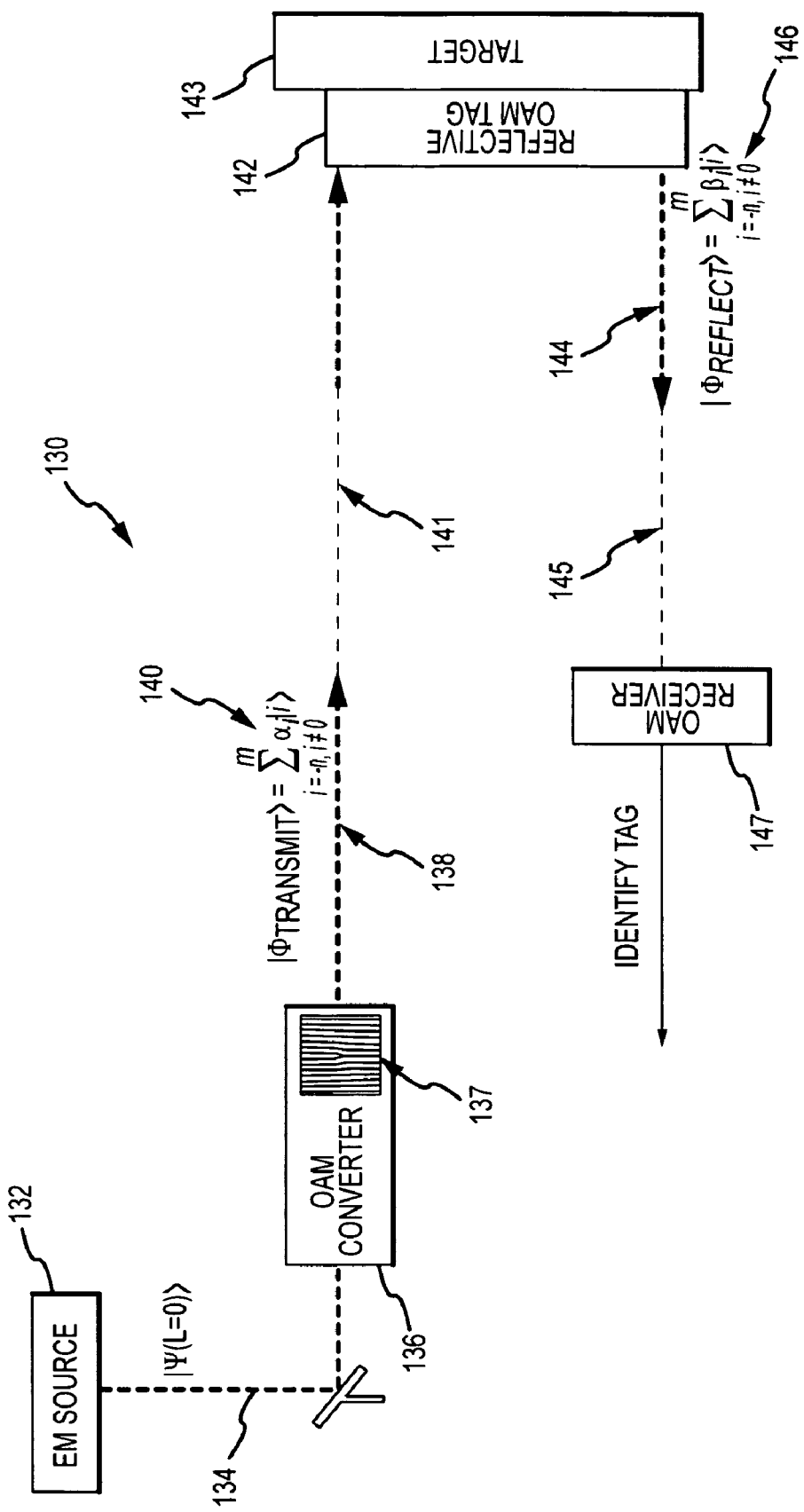

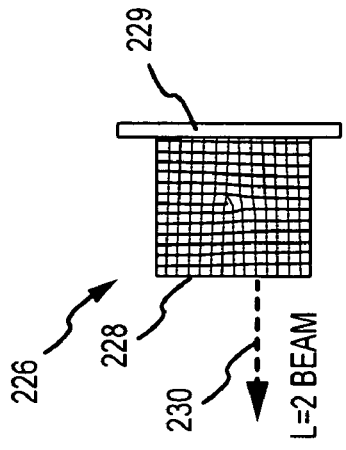
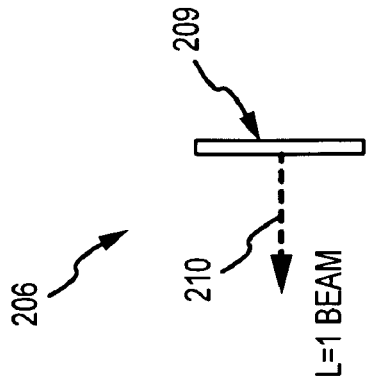
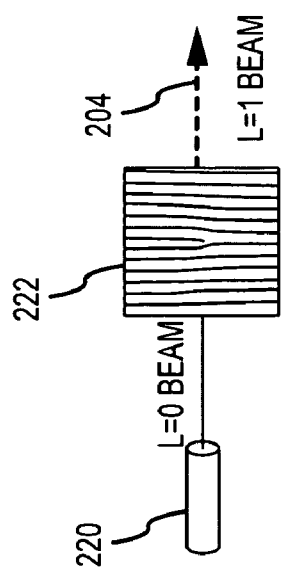
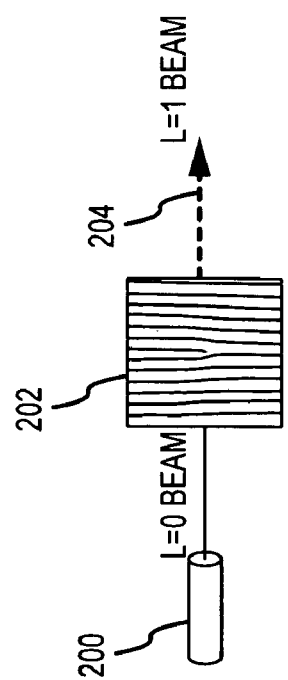
FIG.9a
FIG.9b

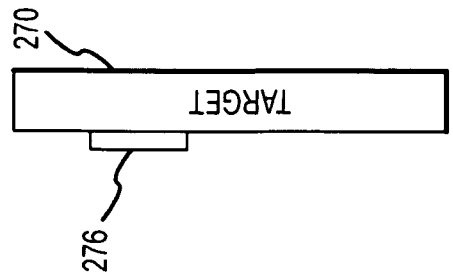
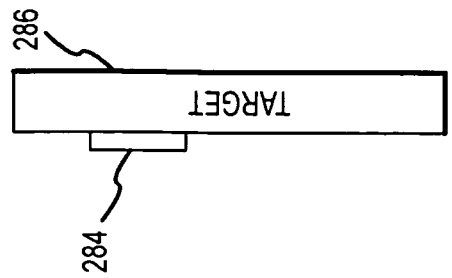
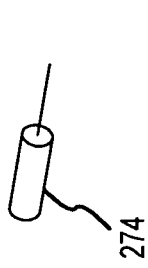
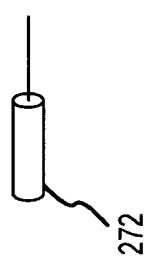
FIG.12a
(PRIOR ART)
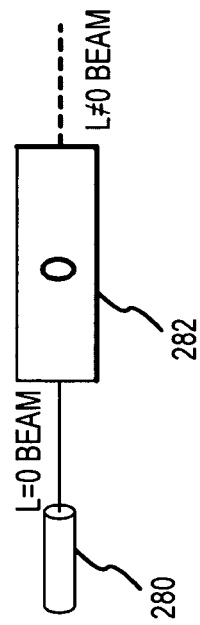
FIG.12b

RECEIVE ALL FOUR CHANNELS

SYSTEM AND METHOD OF ORBITAL ANGULAR MOMENTUM (OAM) DIVERSE SIGNAL PROCESSING USING CLASSICAL BEAMS

CROSS-REFERENCE TO RELATED APPLICATIONS

This application claims benefit of priority under 35 U.S.C. 119(e) to U.S. Provisional Application No. 61/081,802 entitled "System and Method of OAM Diverse Signal Processing Using Classical Beams" and filed on Jul. 18, 2008, the entire contents of which are incorporated by reference.

BACKGROUND OF THE INVENTION

1. Field of the Invention

This invention relates to orbital angular momentum (OAM) diverse signal processing using classical beams for applications in which OAM signal character is controlled such as optical tagging and applications in which OAM signal character is not controlled such as clutter mitigation and interference cancellation.

2. Description of the Related Art

Polarization diverse signal processing using electro-optical (EO) and radio frequency (RF) beams is used in applications such as "tagging" in which the polarization signal character is controlled and object detection, identification and tracking in which the polarization is affected by the object and its surrounding environment. The polarization state of the reflected probe signal is post-processed to identify a 'tagged' object or to detect, identify, track etc. an 'untagged' object.

FIG. 1 illustrates the functional components of a generic passive electromagnetic tagging system. There are three primary components: (i) the transmitter 10 which sends out the electromagnetic probe signal 12; (ii) the passive tag 14 on a target 15 that captures the probe signal, possibly alters the signal in a well defined manner, and transmits the (altered) return signal 16; and (iii) a reader 18 that receives the return signal, post-processes it to boost the signal-to-noise ratio and decodes the carried information. In many systems, the transmitter 10 and reader 18 are co-located on the same platform so that the reader lies in the direct return path of return signal 16. However, the return signal 16 can be received along other return paths making it easier for 'unfriendly' receiver to intercept the return signal. Passive tagging systems operate most commonly at radio (approximately 30 MHz to 3 THz) and electro-optical (visible band (VB) and infra-red (IR) spanning approximately 0.3 THz to 300 THz) frequencies.

FIG. 2 shows one realization of a passive radio frequency (RF) tag system. The electromagnetic emitter is an RF antenna 20 capable of producing a coded transmitted waveform 22. The passive RF tag 24 on target 25 usually has electronic circuitry that provides a varying degree of security and covertness. Receive and hold circuitry preserves the coded transmitted waveform in the coded return signal 28. Enhanced security can be realized with signal imprint circuitry that imprints a known time-varying signal onto the received RF signal or by changing the received RF waveform code in a specified manner to produce the coded return signal 28. The initial coded waveform and additional signals may be coded into the polarization or using other means. Covertness is typically achieved by spreading the RF energy across multiple RF wavebands (spread spectrum). The reader is an RF antenna 32 that uses matched filtering/pulse compression to recover the spread-spectrum RF return. Additional signal processing is possibly included to further decode the signal.

FIG. 3 shows one realization of a passive electro-optical (EO) tag system. There are a wide variety of extant passive EO tag systems. FIG. 3 illustrates an implementation based on the polarization of the EO signal. Here, the emitter is a laser 34 that transmits a signal 36 having well-defined polarization. At the EO tag 38 on target 40, a quarter-wave plate 42 alters the polarization of the received EO beam in a well-defined manner, and a retro-reflector 44 provides a simple mechanism for producing the return EO signal 46. The reader 48 consists of some optical elements 50 that preprocess the return EO signal, a Focal Plane Array (FPA) 52 for collecting the return EO signal, and possibly additional signal processing 54 to further decode the signal.

FIG. 4 shows one realization of a polarization-diverse antenna system. In this case, the depicted antenna 56 has two transmit/receive channels, each capable of processing both degrees of polarization. The transmitter 58 transmits a vertically polarized beam 60 from both channels. A target scene 62 is probed by the antenna. The scene contains a man made object 64 whose returns 66 are strongly polarized in the vertical direction as well as more natural clutter 68 whose diffuse returns 70 are more homogeneously polarized in both the horizontal and vertical directions. The antenna receiver 72 measures both polarization components of the return signal. The polarization components are processed to detect, identify, track etc. man made object 64.

SUMMARY OF THE INVENTION

The present invention provides a system and method of OAM diverse signal processing using classical beams for applications in which OAM signal character is controlled such as optical tagging and applications in which OAM signal character is not controlled such as clutter mitigation and interference cancellation for target detection, identification etc.

This is accomplished by transmitting an electromagnetic source beam having a prescribed state with one or more non-zero OAM components, reflecting the source beam off a target and receiving the return beam in the direct return path to measure the one or more OAM components to identify the target. The source beam may have several OAM components that provide additional degrees of freedom for signal processing of the return beam. In addition, the OAM components and processing can "piggy-back" on top of other systems and functionality to facilitate integration and expanded functionality. In OAM tagging systems, the OAM tagging may be integrated with polarization tagging, RF sensing or EO range finding for example. In OAM diverse signal processing systems, the OAM may be integrated with the conventional polarization-diverse RF antenna system.

In OAM tagging systems, an OAM tag controls the non-zero OAM components of the source beam. In the general and most interesting case, the OAM tag is designed and matched to the prescribed state of the source beam. The OAM tag includes a diffractive element that alters in a known manner (e.g. a prescribed transform) the non-zero OAM components of the prescribed state of the source beam to produce a different prescribed state in the return beam. The source cannot generate just any combination of OAM components and expect the OAM tag to function properly. The OAM source and OAM tag are a matched pair with the transform imparted by the OAM tag being designed based on knowledge of the OAM transform of the source. The transforms imparted at the source and by the OAM tag are known by the receiver to decode the returned waveform. This relationship provides an additional measure of security. In a specific and less interesting case, the OAM tag is simply a reflector that preserves or maintains the prescribed OAM state of the source beam. The receiver must still be configured to detect OAM and lie in the direct return path but the source and OAM tag are not uniquely matched, hence the system is less secure. In certain systems, the OAM tag may be configured as a retro-reflector to reflect the incident source beam back along its direct return path to the receiver.

In the general case, the RF and EO OAM tags comprise a grating and a hologram, respectively. The tag may include multiple gratings or holograms, which may be configured to reflect the source beam simultaneously or in a temporal sequence. The gratings are mechanically shuffled to affect the temporal sequence whereas the holograms may be computer generated. A spatial light modulator (SLM) is one approach to implementing a dynamic computer generated hologram to provide a temporally agile transform of the OAM components. The temporal sequencing may be done to increase security, work with multiple source beams each with a different prescribed state and/or to encode additional dynamic information into the OAM components of the return beam. Furthermore, the temporal sequencing may be synchronized to changes in the prescribed state that are matched to the different tags. The receiver measures the OAM components of the return beam. Knowing the transformation imparted by the OAM tag, these components are then compared to the prescribed OAM state of the source beam to identify the tag and possibly to decode any additional information that was provided by the tag.

In OAM diverse signal processing systems, the source beam is reflected off an 'untagged' man made target in a background. Although the target and background do not preserve or alter the OAM states in a known manner, the target and background will alter the OAM states in very different ways. The alteration of a single OAM state can be processed in much the same manner as polarization-diverse signals. The real advantage of OAM processing comes from the additional degrees of processing freedom provided by using multiple OAM components and/or using both OAM and polarization processing together to detect, identify, track etc. the target. Multiple OAM components can be transmitted by generating a source beam having multiple non-zero OAM components, generating a source beam having one non-zero OAM component that changes with time or multiplexing multiple source beams each having a different non-zero OAM component. This increased diversity should greatly enhance the processing capabilities for clutter mitigation and interference cancellation, for example, without disruptive modifications to the RF transmit/receive antenna and receiver processing.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2, as described above, is a diagram of a passive radio frequency (RF) tagging system;

FIG. 7 is a diagram of a passive OAM tagging system;

FIGS. 9a and 9b are diagrams depicting an EO OAM tag that alters in a known manner and preserves the OAM of the source beam, respectively;

FIGS. 12a and 12b are diagrams of a known system for laser ranging and IFF and an integrated OAM laser ranging/IFF system in accordance with the present invention, respectively;

DETAILED DESCRIPTION OF THE INVENTION

The present invention describes a system and method of OAM diverse signal processing using classical beams for applications in which OAM signal character is controlled such as optical tagging and applications in which OAM signal character is not controlled such as clutter mitigation and interference cancellation for target detection, identification etc. This is accomplished by transmitting a source beam having a prescribed state with one or more non-zero OAM components along a source path, reflecting the beam off a 'tagged' or 'untagged' target and receiving the return beam in the direct return path to measure the one or more OAM components to identify the target. The direct return path retraces the source path with perhaps a small offset induced by the OAM tag or target. The full beam front received along the direct return path is needed to reconstruct the wave front. This provides affords a high degree of security in communication. The OAM transmitter/receiver and/or OAM tag may be configured to strengthen the beam front that is received along the return path. For example, the transmitter/receiver may require the OAM tag be inserted perpendicular to the source path or the OAM tag may include a retro-reflector that reflects the incident source beam back along the direct return path. OAM processing provides additional degrees of processing freedom to greatly enhance the processing capabilities to detect and identifier both 'tagged' and 'untagged' targets.

Orbital Angular Momentum (OAM)

The recognition in the early 1990s that light beams could possess orbital angular momentum (OAM) as well as spin angular momentum (polarization) has led to a flurry of both experimental and theoretic research activity. The result has been a remarkable series of technical advances that now enable the routine generation, manipulation and measurement of intense beams of light possessing well-defined and well-controlled OAM characteristics. A number of early experiments involving so-called optical spanners demonstrated that classical OAM light beams could rotate microscopic particles, thus conclusively showing such beams possess OAM. The successful measurement of single photon OAM in 2002 resulted in a strong theoretical research focus on the novel quantum mechanical properties of such photons. Besides the aforementioned optical spanners and high-information-density communication, the preponderance of experimental work is also now squarely in the few-photon domain (e.g., quantum encryption, highly entangled states and quantum computing).

Figure 1:
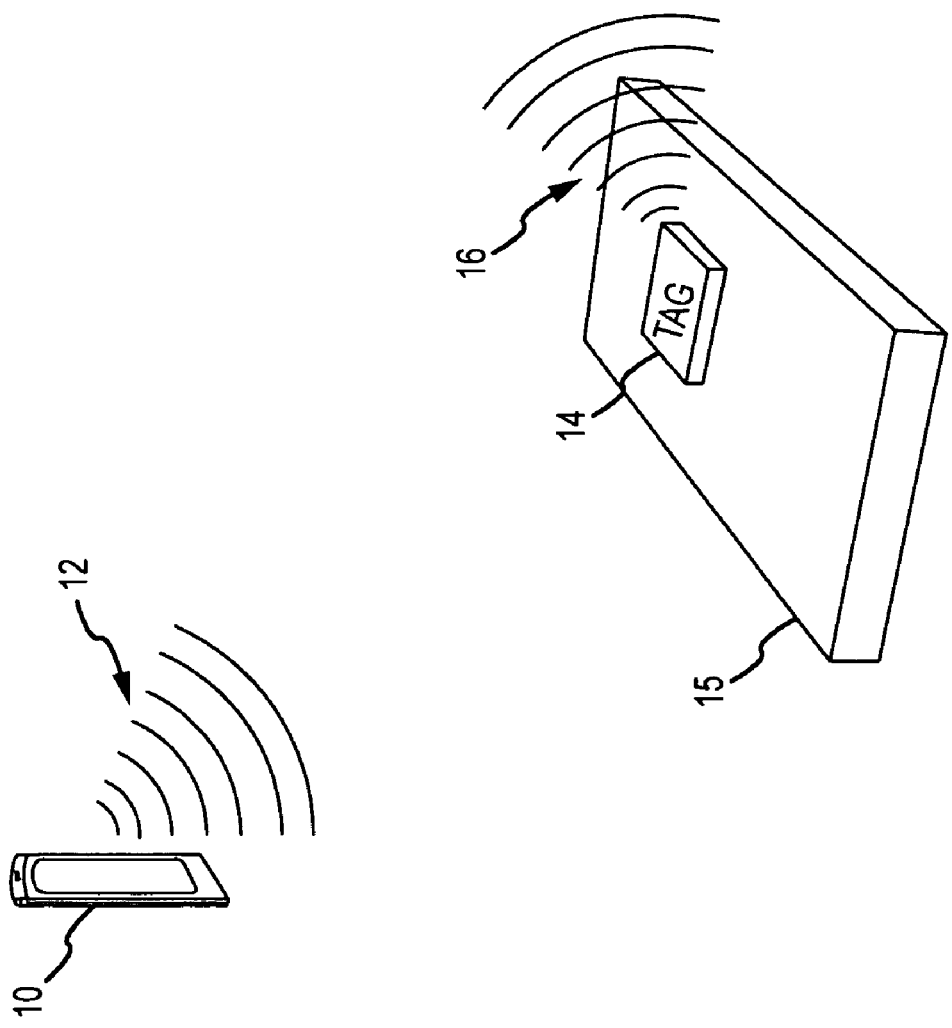
FIG. 1, as described above, is a diagram of a passive electromagnetic tagging system.
Figure 3:
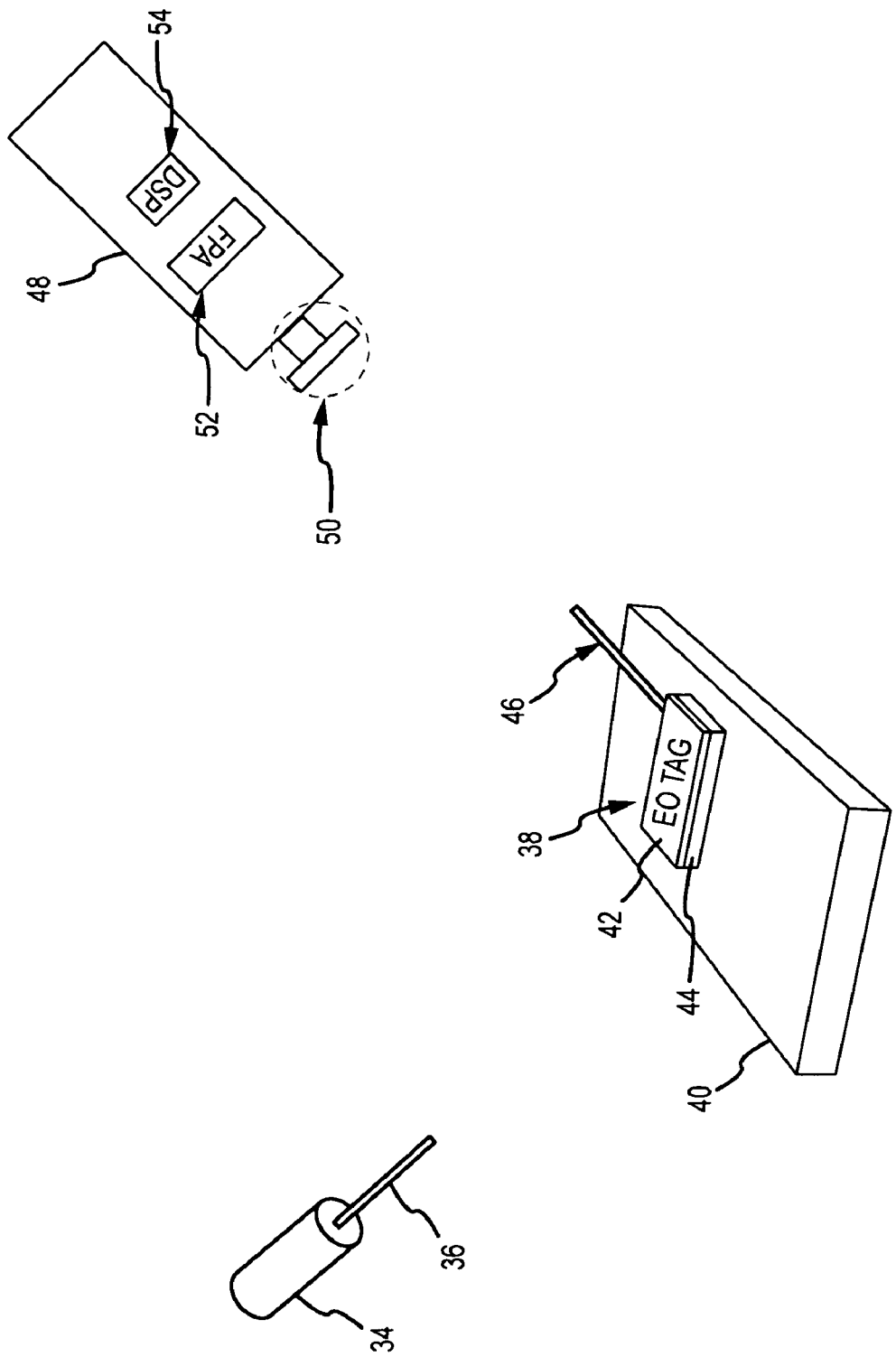
FIG. 3, as described above, is a diagram of a passive electro-optical (EO) tagging system.
Figure 4:
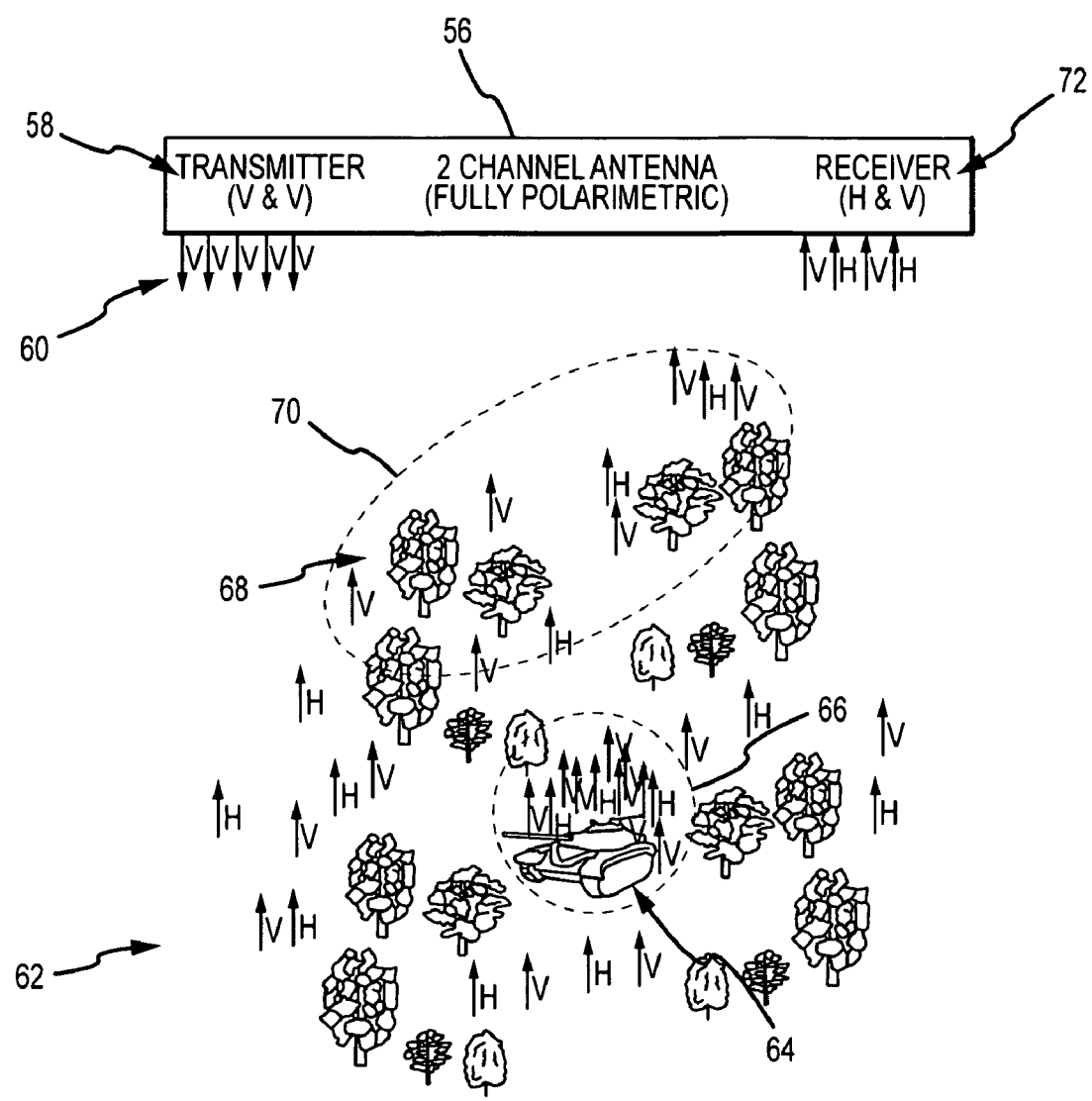
FIG. 4, as described above, is a diagram of a polarization-diverse RF reflector antenna and receiver for detection of man made objects from among clutter.
Figure 5:
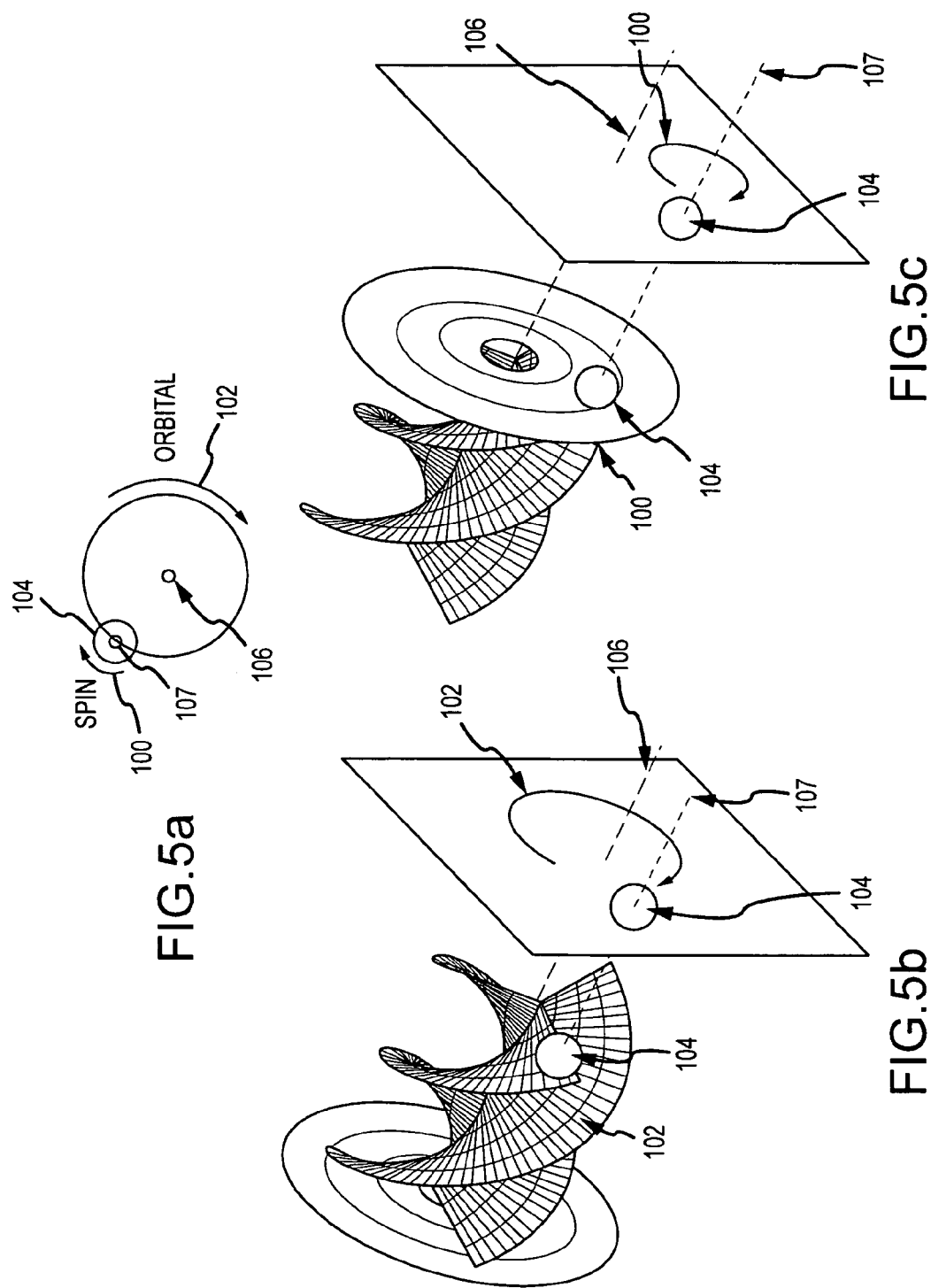
FIGS. 5a-5c are diagrams illustrating the spin momentum and orbital angular momentum of a photon.

FIGS. 5a-5c illustrate both spin angular momentum 100 ($\sigma=\pm h$) and orbital angular momentum 102 (L) of a photon 104 about the beam axis 106. Put clearly, the spin angular momentum 100 represents the spin of the photon about its own axis 107 and the OAM 102 represents the spin of the photon around the beam axis 106.

Electromagnetic radiation is a wave phenomenon and thus has mechanical properties, such as momentum. The fact that electromagnetic radiation possesses linear momentum is likely familiar to most scientists from studies of radiation pressure, the photoelectric effect, atomic trapping, etc. More familiar in defense signal processing is the fact that electromagnetic radiation also has spin angular momentum, although this knowledge is usually in the context of polarization. While it is well known that the spin of a single photon is quantized ($\sigma=\pm h$), this property is seldom needed or exploited by these practitioners. Rather, the vast majority of defense applications occur firmly in the classical limit where only the statistical ensembles of extremely large numbers of photons are meaningful. The idea that electromagnetic radiation should further possess OAM may seem obvious in hindsight, but it was not recognized until 1992.

A key milestone in the study of electromagnetic radiation with OAM was the demonstration that single photons have quantized OAM in exact analogy with spin angular momentum. In spite of the early realization that beams of electromagnetic radiation with OAM can be used to investigate analogues of polarized light, albeit within a larger range in the OAM values, the vast majority of theoretical and experimental research is devoted to novel quantum mechanical properties. Except for the application of optical spanners, the classical limit remains largely unexplored. This is a rather glaring oversight given that it is now common for laboratories to produce, control and measure high quality electromagnetic beams with well defined OAM.

With some variation in the detailed implementation, beams of electromagnetic radiation having OAM are not generated directly but rather by converting beams with zero OAM. At electro-optical frequencies, a Hermite-Gauss laser beam is converted to a Laguerre-Gauss beam, most commonly using holographic methods. At millimeter wave frequencies, a linearly polarized beam is converted by using a specially designed grating with or without blazing. The conversion process can be designed to have very high efficiency and, at least for the electro-optical case, with a significant degree of adaptivity. These experimental characteristics are extremely promising for developing field-capable sources that enable some unique signal processing applications.

Figure 6:
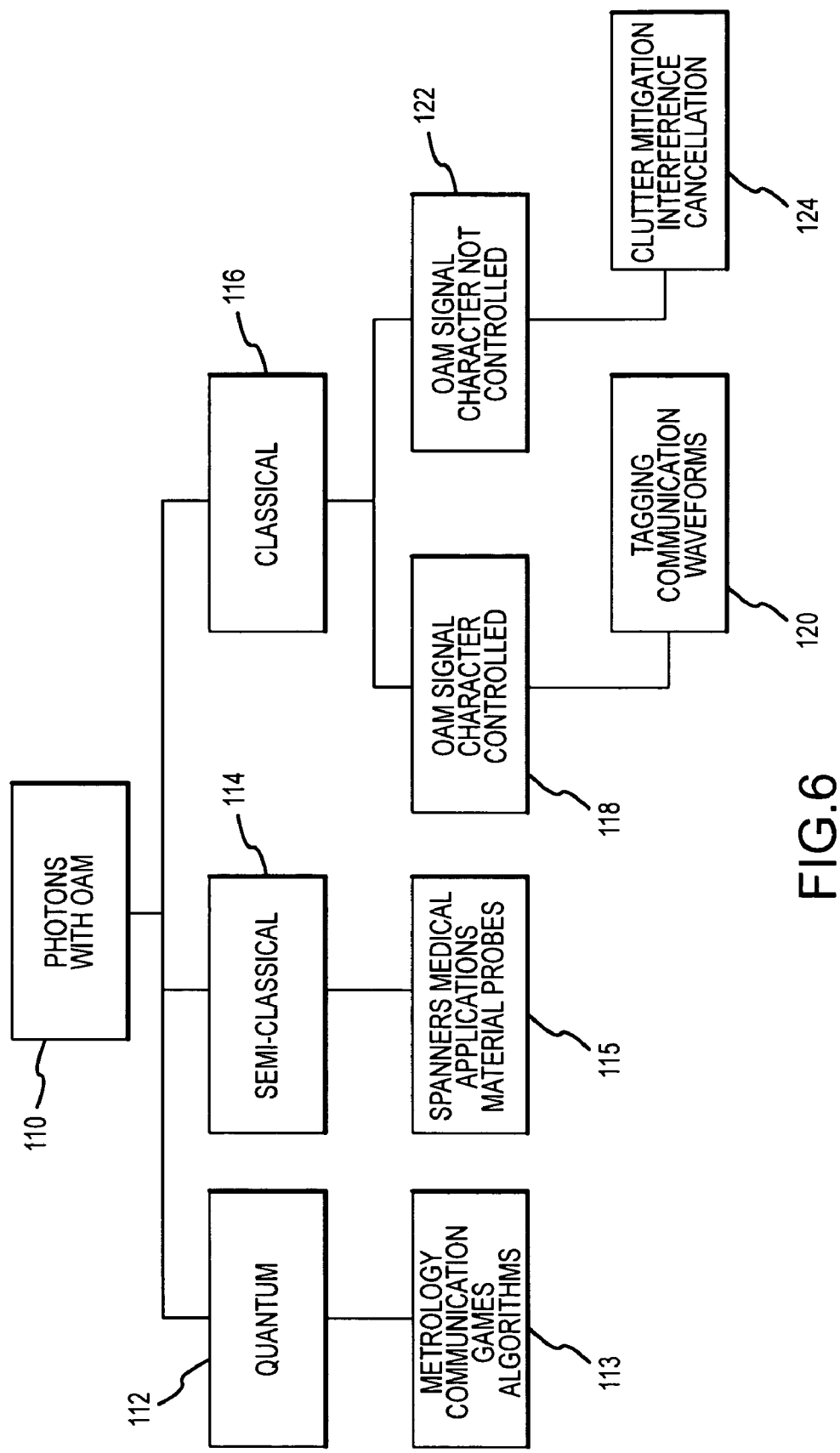
FIG. 6 is a diagram of a partition of the application space for photons with OAM.

FIG. 6 shows one possible partitioning of the application space for photons with Orbital Angular Momentum (OAM) 110. A natural and useful, although not unique, first level of classification is the number of photons. Applications involving a few photons comprise the quantum regime 112 that include metrology, communication, games and algorithms 113; applications involving many photons comprise the semi-classical regime 114 that include spanners, medical applications and material probes 115; and applications (such as those described herein) involving statistical ensembles of photons comprise the classical regime 116. Within the classical regime, it is useful to distinguish between applications that control the OAM character of the beam 118 such as tagging, communications and waveforms 120, and those that do not 122 such as clutter mitigation and interference cancellation for the detection of 'untagged' targets 124. As referred to above, some research has been conducted on communications and waveform applications. Gabriel Molina-Terriza et al "Twisted Photons" 2007 Nature Publishing Group pp. 305-310 reviews the landmark advances in the study and use of OAM of photons. The present invention addresses the use of diverse OAM signal processing for detecting 'tagged' and 'untagged' targets.

OAM Signal Character Controlled

Tagging has been proposed as a core technology critical to a class of defense problems that includes: Identification Friend or Foe (IFF), 100% Identification (100% ID) and a number of other more sensitive uses that are similar in spirit. This class of problems has a number of inherent characteristics that makes them ideal initial tests for classical beams of OAM photons. These applications are almost exclusively cooperative engagements. This means that we are allowed significantly more control over the CONOPS (Concept of Operations) than in more typical non-cooperative engagements. In particular, we have more freedom in configuring sensors and communication devices; material coatings can be designed and applied in innovative manners; and, while potentially beneficial, communication coding schemes need not be Low Probability of Intercept (LPI).

There is a critical trade-off, however: the consequences for an incorrect identification are particularly severe. This requires developing methods of achieving as close to a probability of detection of one ($P_D=1$) with zero false alarms ($P_{FA}=0$) as possible. The Fog of War makes this requirement especially stringent, particularly in highly cluttered urban environments. Numerous approaches to solving the IFF/100% ID problems exist but none currently approaches the level of performance needed for modern urban warfare that frequently involves multiple coalition partners. One potential solution that has been studied fairly extensively is "tagging", which generally defined covers a range of different sensor modalities (radar, optical, active, passive etc.). DARPA has investigated several innovative approaches to optical tagging that exploit highly unique responses; the idea being that such signals were more easily and reliably detected even in a highly cluttered environment.

Our approach to Tagging is similar in spirit to the last approach but also has some key differences, namely the exploitation of OAM properties that may provide substantial additional capabilities. We too rely on a unique signal content to ensure a positive identification even in the presence of significant clutter. A key discriminator of our technique is the use of a probe beam with a well defined non-zero OAM $$|\Phi_{transmit}\rangle = \sum_{i=-n, i \neq 0}^{m} \alpha_i |i\rangle$$

—a property not possessed by naturally occurring background radiation. The probe beam is returned from the target surface coated with a reflective tag that controls the OAM of the probe beam in a well prescribed manner $$|\Phi_{reflect}\rangle = \sum_{i=n, i \neq 0}^{m} \beta_i |i\rangle.$$

We note that the reflective tag could be either a static device (i.e. a pre-patterned diffraction element or a mirror), or a dynamic device, realized by incorporating a time-varying diffraction element (e.g., via computer generated hologram, mechanical shuffling of gratings, a spatial light modulator, metamaterials or controlled plasmonic resonances). This added capability to (adaptively) code the return signal is a second powerful discriminator of our approach.

OAM based Tagging provides a very high degree of ab initio security for reasons both clear and subtle. One clear reason is that most detectors are not designed to measure OAM nor would most eavesdroppers know enough to even look for it. More subtly, an uncertainty relation of the form ($\Delta L \Delta \phi \geq \frac{1}{2}$) imposes significant challenges to any eavesdropper. Specifically, the receiver must lie in the direct return path (with a small offset possibly). The full beam front is needed to reconstruct the waveform. This affords a high degree of security in communication. In cooperative scenarios the unique matching of the OAM tag to transform a prescribed OAM state of the source beam in a prescribed manner provides an additional level of security. Only OAM tags designed for the prescribed OAM state of the source beam will return a meaningful signal and the receiver must know the prescribed transform executed by the OAM tag to decode the returned signal. The use of a simple reflective surface or mirror provides the first two security features only. The simple reflective embodiment is more susceptible to either a random reflection appearing as a positive tag or to active countermeasures in which the enemy wears a simple reflective tag to defeat the IFF system. These problems are overcome by using an OAM tag having a diffractive element matched to the prescribed OAM state of the source beam. In this case, the OAM tag must have knowledge of the prescribed source state and the receiver must have knowledge of the prescribed source state and the transform imparted by the OAM tag to decode the returned waveform. This knowledge is not required to measure the OAM components in the returned beam but to decode them downstream.

OAM Tagging

FIG. 7 describes the design of a passive OAM tagging system 130 in greater detail. An EM source 132 generates an electromagnetic beam 134 in a well defined initial state—for example circularly polarized (RF) or Hermite-Gauss (EO). This electromagnetic beam (with zero OAM) then passes through an OAM converter 136 including one or more diffractive elements 137 [grating for RF or computer generated hologram (CGH) for EO] that converts this beam into a beam 138 with a well prescribed state with one or more non-zero OAM components $\alpha_i$ 140. The CGH is very flexible and capable of generating extremely complex OAM states. Both positive and negative single values of OAM (i.e., ±L) can be created. As well, both positive and negative multiple values of OAM can be produced, in a symmetric manner (i.e., ±1, ±2, . . . , ±L) and a non-symmetric manner (i.e., -L', -L'+1 . . . -1, +1, +2, . . . , +L). The OAM beam exiting the diffractive element follows a source path 141, reflects off a reflective OAM tag 142 that is located on a target 143 as return beam 144 that follows a return path 145. The return path 145 essentially retraces source path 141 with perhaps a small offset induced by tag 142.

In the general case, the OAM tag includes a diffractive element e.g. a hologram for EO or grating (such as a forked grating) for RF, that is 'matched' to the prescribed state of the source beam to alter (transform) them in a known manner. In a special case the OAM tag is a simple reflector that preserves the OAM components. If preserved the "β" values 146 for the OAM states in the return beam 144 and the "α" values in the probe beam satisfy $\beta_i = \alpha_i$. If altered, the "β" values for the OAM states in the return beam 144 are altered in a manner known by both the OAM tag and receiver. The reflective OAM tag is designed by specifying the prescribed state of the source beam (e.g. the "α" values) and the different prescribed state of the return beam (e.g. the "β" values) and the band of the EM spectrum (e.g. EO or RF). Given these parameters, the hologram(s)/grating(s) required to implement a prescribed transform of the OAM components from the source state to the returned state are designed. Note, if the "α" values of the source beam change, the OAM state of the return beam is unintelligible and meaningless to the receiver. To preserve the OAM components, the tag is a reflecting surface regardless of the "α" values of the prescribed state of the source beam.

The return beam 144 is received by an OAM receiver 147 positioned in the direct return path 145 that measures the one or more non-zero OAM components and compares the measured components to the prescribed state of the probe beam to "identify" the OAM tag 142. If the prescribed state of the probe beam is known, the receiver may implement a matched filter to improve Signal to Noise ratio. Here "identify" may mean simply identifying that the prescribed OAM components were received, identifying friend or foe or may mean identifying a particular tag. Furthermore, processing may identify additional information encoded into the OAM states by the reflective OAM tag. The additional information may relate characteristics or conditions of the target. These characteristics or conditions may change with time and require a smart dynamic OAM tag to encode that information.

Figure 8A:
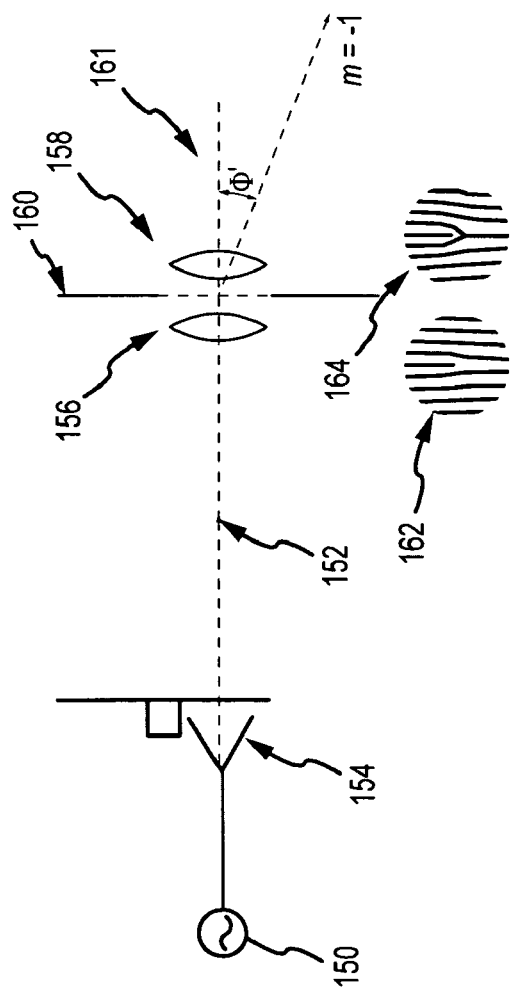
FIGS. 8a and 8b are known sources for generating RF and EO beams with a prescribed state with non-zero OAM, respectively.
Figure 8B:
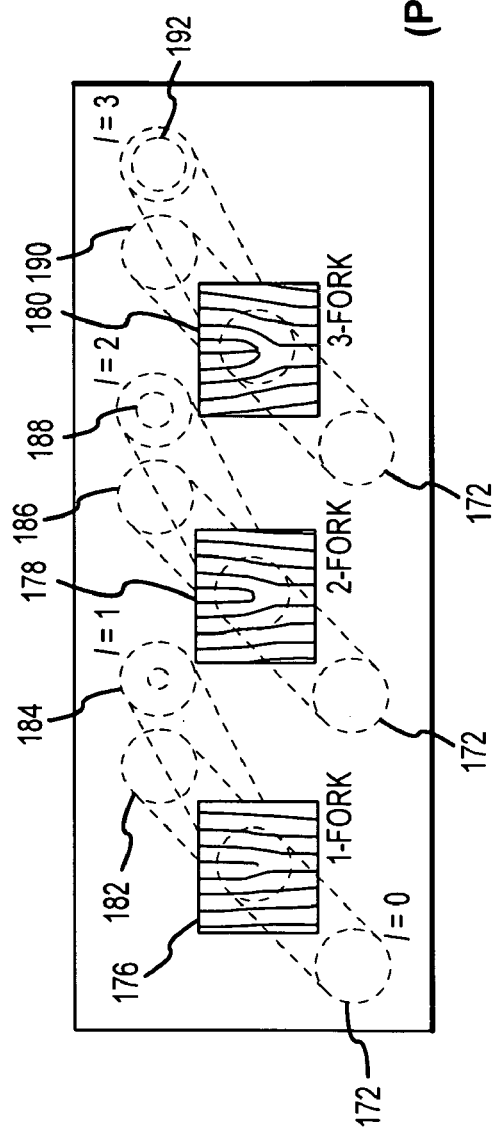

FIGS. 8a and 8b illustrate the extant mechanisms for generating electromagnetic beams comprised of photons having well-defined OAM. Both RF and EO OAM conversion require the use of a diffractive element. For RF electromagnetic beams, the diffractive element is a grating such as a forked grating, whereas for EO electromagnetic beams the diffractive element is a computed-generated hologram. The input RF electromagnetic beam is usually circularly polarized, whereas the input EO electromagnetic beam typically has a Hermite-Gauss beam profile. The diffractive elements can be designed to produce output electromagnetic beams with arbitrary integer values of OAM.

A beam of light can be described by its electric field as a function of space and time. To adequately represent an optical field requires a representation of the field using a set of basis functions. The Gaussian basis is most convenient for representing laser modes; however, it is also possible to express any optical field as a sum over the Gauss-Laguerre basis where the basis functions in general possess non-zero orbital angular momentum, often referred to as charge. These higher-order modes have an electric field that can be written as (at constant time):

$$E(r, \phi, z) \propto \left(\frac{\sqrt{2}\,r}{w}\right)^l L_p^l\!\left(\frac{2r^2}{w^2}\right)$$

$$\exp\!\left[ikz - i(2p + l + 1)\arctan\!\left(\frac{z}{z_r}\right) - \frac{r^2}{w^2} - \frac{ikr^2 z}{2(z_r^2 + z^2)} - il\phi\right]$$

where w is the 1/e radius of the beam $L_p^l$ is the associated Laguerre polynomial with azimuthal and radial mode numbers l and p respectively, k is the wavenumber and $z_r$ is the Rayleigh distance. There are numerous ways to generate OAM beams, but one of the simplest and most robust is the method of using diffractive gratings.

As shown in FIG. 8a to generate an RF beam with a prescribed state including one or more non-zero OAM components a 105-GHZ solid-state oscillator 150 generates a beam 152 having zero OAM. The beam passes through an optical chopper 154 and a pair of lenses 156, 158 on either size of a forked grating 160 to produce an RF beam 161 having a prescribed state with one or more non-zero OAM components. Forked gratings (either plane or blazed) 162 and 164 that generate l=1 and l=2 states are shown. Blaze gratings have a significantly improved OAM conversion efficiency and will be used in most practical instantiations. G. Fergus Brand "Millimeter-Wave Beams with Phase Singularities" IEEE Transaction on Microwave Theory and Techniques, Vol. 46, No. 7, Jul. 1998 pp. 948-951 discloses the generation of RF beams with non-zero OAM in more detail. Forked gratings are but one example of a grating structure that can be used to generate the source beam or in the OAM tag to transform the OAM components.

As shown in FIG. 8b, to generate an EO beam with a prescribed state including one or more non-zero OAM components a zero-OAM beam 172 is passed through a diffractive optical component (e.g. a computer generated hologram). A hologram enables the transformation of any wavefront into any other. The input OAM state l=0 and the desired non-zero OAM state are defined and the hologram is design to provide that transformation. For example, 1, 2 and 3-forked holograms 176, 178 and 180 convert a Gaussian spot into OAM beams. When the beam hits the 1-forked hologram 176 it is diffracted into three spots. The central component is the undiffracted (zeroth order) spot 182, and the two sidelobes have charge plus one 184 and minus one (not shown). The beam intensity after diffraction clearly shows the characteristic 'doughnut' shape of the OAM modes and the central Gaussian spot. When the beam hits the 2-forked hologram 178 it is again diffracted into an undiffracted spot 186 and two sidelobes with charge plus two 188 and minus two (not shown) Likewise when the beam hits the 3-forked hologram 180 it is diffracted into an undiffracted spot 190 and two sidelobes with charge plus three 192 and minus three (not shown)

As described above, except for the special case of a mirror that simply preserves the OAM components, the reflective OAM tag is 'matched' to the particular prescribed state of the source beam. The OAM tag is not a generic OAM reflector that can be used with any source beam. In general, given the prescribed non-zero OAM components of the source beam, the OAM tag is designed to implement a prescribed transform to reflect a return beam having a different prescribed state with one or more non-zero OAM components. The source OAM and transform imparted by the OAM tag are known only by the receiver in order to decode the returned waveform. If the state (OAM components) of the source changes, the returned OAM components are meaningless. The OAM tag may comprise one or more diffractive elements which may be static or dynamic depending on the application. The OAM tag may also encode additional content into the OAM components in the return beam.

FIG. 9a illustrates the general case in which the prescribed state of the EO source beam is altered (transformed) in a known manner, either statically or dynamically. An EO source 220 generates a non-OAM beam (l=0) that passes through a computer generated hologram (CGH) 222 to generate a beam 224 having one non-zero OAM component (l=1) with a particular "α" coefficient. An OAM tag 226 includes a CGH 228 and reflector 229 that produce a return beam 230 having two non-zero OAM component (l=2) with the different "β" coefficients. Alternately, the tag could return a single OAM state but change the coefficient. This tagging system is very reliable and very secure. First, the source beam and OAM tag must be "matched" to each other and the prescribed state of the source and the OAM tag transform known to the receiver. Second, the receiver lies in the direct return path to receive the return beam. Third, the prescribed state is not limited to a single OAM component but may have very high dimensionality with very specific "α" coefficients which increases both security and reliability. As such, it would be very difficult for the enemy to intercept and decode the return beam or to counterfeit OAM tags that would appear 'friendly' to our receiver.

Altering the prescribed state may also be used to encode additional information about the tag or its target into the OAM states of the return beam. This could be done with a static tag in which the information is pre-programmed for a given target or with a dynamic tag that conveys information that changes with time or a state of the target. In these cases, the receiver does not know the additional information a priori but does know the underlying transformation (and any other coding techniques used specifically for the additional information) so that the OAM states can be decoded. The OAM tag could include multiple reflective CGHs each defined for a particular prescribed state of a different sort to make the tag quasi-generic. If one knew that the OAM tag would be used in an environment in which say 5 different sources would be used the tag could work with each of those sources. The tags could be physically different tags or a single dynamic tag that presented a sequence of the 5 different CGHs. A source illuminating the tag would see 4 return beams that were unintelligible but could then read the beam.

Metamaterials are envisioned as being incorporated on transmission, reflection or both to provide additional freedom for altering the beam. Altering the reflected coded waveform in novel ways using non-standard coating is motivated by some of the early results of parametric up conversion where it was shown that a single photon of OAM, l, was converted to two photons, each with orbital angular moment 2l. Another promising area of technology that is just now becoming widely discussed in the context of highly novel filters is plasmonic engineering. For both transmission and reflection, Negative Index Materials (NIM) might provide additional novel control. For example, NIM materials have been proposed to enhance diffraction filters, an application that may have utility in the generation of millimeter wave OAM electromagnetic radiation.

FIG. 9b illustrates the special case in which the prescribed state of the EO source beam is preserved in the prescribed state of the return EO beam. An EO source 200 generates a non-OAM beam (l=0) that passes through a computer generated hologram (CGH) 202 to generate a source beam 204 having one non-zero OAM component (l=1) with a particular "α" coefficient. An OAM tag 206 includes a reflector 209 that reflects a return beam 210 having one non-zero OAM component (l=1) with the same "α" coefficient.

Figure 10:
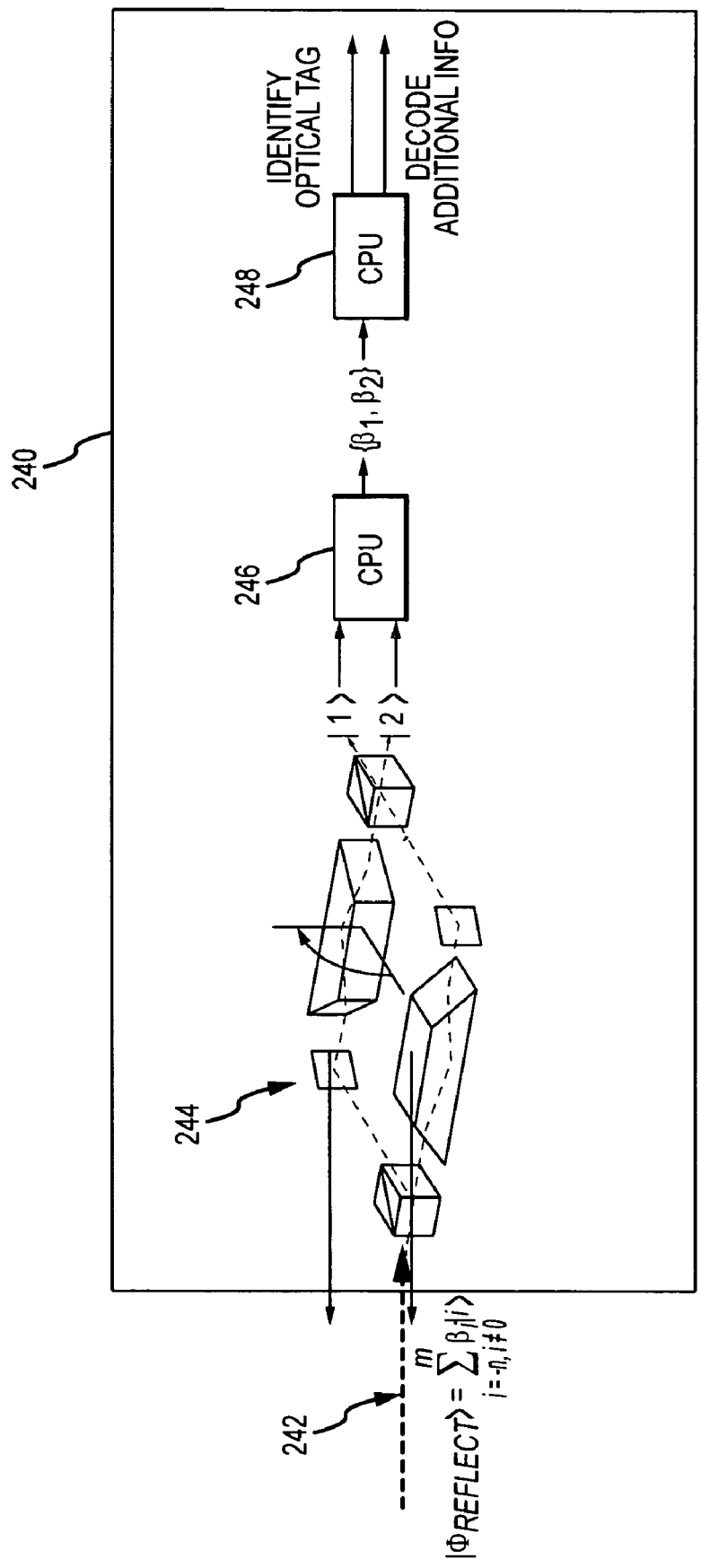
FIG. 10 is a simplified block diagram of an OAM receiver.

An embodiment of an OAM receiver 240 is illustrated in FIG. 10. The receiver is positioned in the direct return path of the return beam 242 to measure the one or more non-zero OAM components and compare the measured components to the prescribed state of the probe beam to "identify" the OAM tag. This particular receiver is configured to receive up to l=2

OAM states (e.g. l=−2, l=−1, l=1, l=2) for an EO tagging system. Return beam 242 is composed of a weighted linear sum of OAM components. An interferometric device 244 is used to separate the individual OAM components of the incoming beam. A CPU 246 post-processes the components to determine the corresponding weights of the OAM components. The process of measuring the OAM components can be performed without knowledge of either the prescribed state of the source beam or the prescribed transform implemented by the OAM tag. A CPU 248 uses the weights to decode the OAM waveform to identify the optical tag and possibly decode any additional information coded in the OAM states. The prescribed state of the source beam and the underlying "transform" of the prescribed state to the return state (i.e. how the tag alters in a known manner the OAM components of the prescribed state) is known by the CPU in a cooperative scenario. This allows the CPU to decode the altered OAM components and compare them to the prescribed state to make an identification decision. Furthermore, knowing the underlying transform and other applicable codes allows the CPU to decode any additional information that is encoded in the OAM components.

Figure 11:
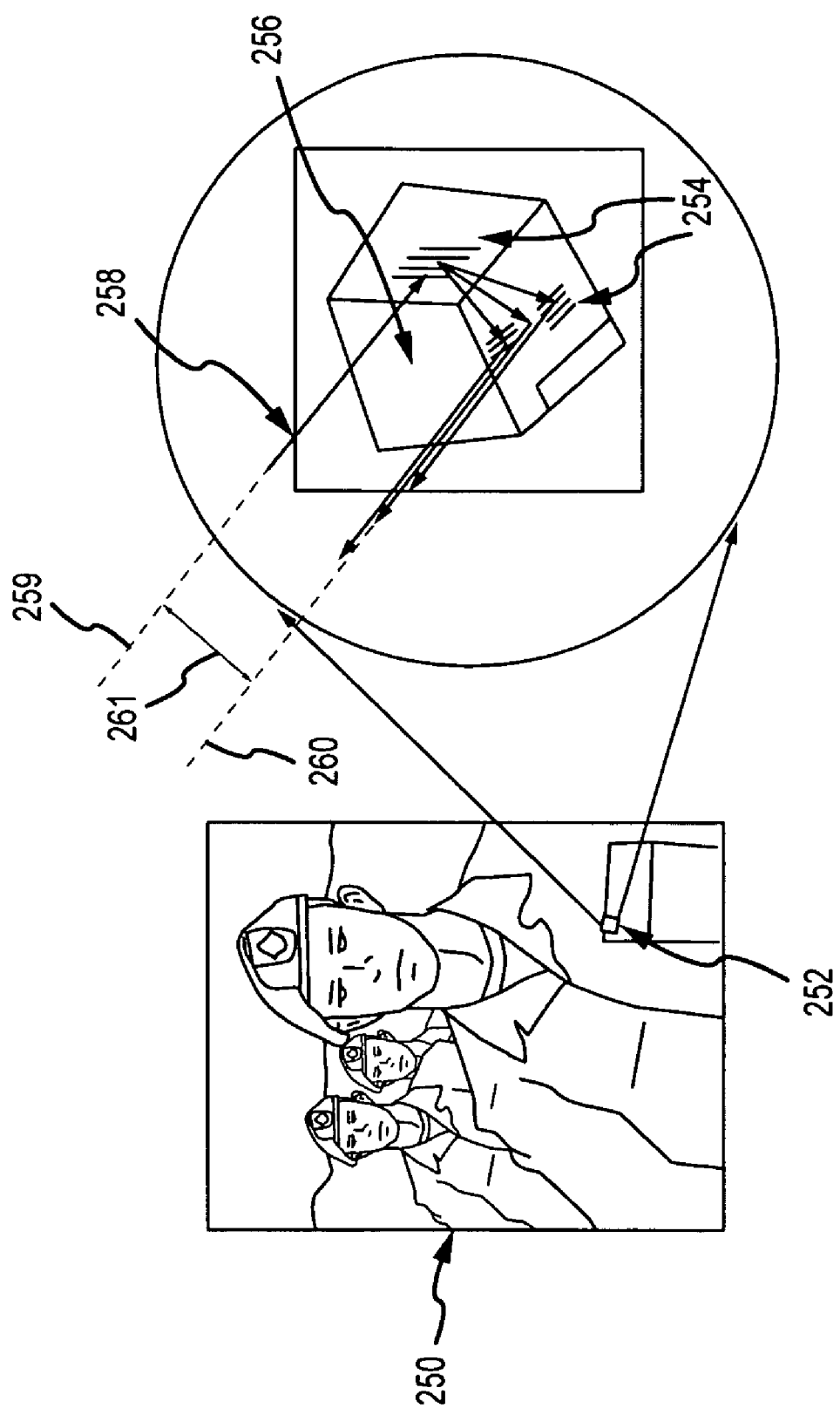
FIG. 11 is a diagram of a corner cube design of a hologram for an OAM tagging system.

FIG. 11 shows one approach for an OAM identification tag design that is more tolerant to alignment uncertainties. It is difficult to reconstruct the OAM value of a return signal without being in the direct return path. The full beam front received along the direct return path is needed to reconstruct the wave front. This is an attractive property from the perspective of developing a highly secure tag, but it places strict alignment constraints on the system design. Here the context is ultimately the tagging and tracking of individual soldiers 250. The probe beam can be supplied in a number of ways, we assume without loss of generality that the transmitter and receiver are located on a long-endurance Unmanned Aerial Vehicle (UAV). In this example, an OAM tag 252 includes a hologram 254 formed on a corner cube reflector 256 so that the probe beam 258 transmitted along a source path 259 is reflected on a direct return 260 path back to the source, although slightly offset by offset 261. The source and receiver being typically co-located on the same platform e.g. the UAV. A corner reflector or more generally "retro-reflector" represents an approach to alleviating these alignment constraints while adding more robustness and flexibility to the operational tag. Perhaps the most robust geometry would be to illuminate the target with a Gaussian beam that is considerably larger than the target. The receiver may simply identify the soldier as friend or foe or may identify a particular soldier and perhaps additional information about that particular soldier. To simply preserve the OAM components, the corner cube reflector 256 may be used without the hologram.

Integration of OAM Tagging with Other Signal Processing Systems

In many applications, the OAM diverse signal processing can be "piggy-backed" onto or integrated with an existing system to provide an additional degree of freedom for that system and/or separate tagging functionality. Integration can simplify the hardware configuration of the system that would otherwise be required to provide the full functionality. For example, the OAM tagging may be piggybacked onto the conventional EO polarization tagging to provide additional security and/or information. The source must be reconfigured to provide the prescribed OAM state and the receiver reconfigured to receive and decode the OAM states but both can be integrated into the existing source and receiver.

The OAM degree of freedom can be combined with a laser ranging capability to form an integrated device for simultaneously providing range and identification-friend-or-foe (IFF) information. FIG. 12a shows an extant approach for providing range and IFF of a target 270. Two components are required for the prior art: (i) a Semi-active laser (SAL) 272 for providing range information; and (ii) an EO probe laser 274 and a passive EO tag 276 combination. The state-of-the-art for the probe laser and tag is to exploit a highly-forbidden spectral signal. The SAL and probe laser are not compatible for integration into a single laser. Polarization coding could be added to the SAL but polarization does not perform well in the cluttered environments (scenes) typical of these scenarios. FIG. 12b illustrates that a well-defined OAM can be added to the transmitted SAL EO beam without affecting its ranging capability. A second laser source for the probe beam is not required. This enables the SAL to simultaneously provide both range and IFF information. The SAL 280 generates a laser beam with l=0 OAM. An OAM generator 282 adds one or more non-zero OAM states to the beam. An OAM tag 284 on a target 286 preserves or alters in a known manner the OAM states, which are returned on a direct return path to the OAM receiver. The higher dimensionality of OAM diversity improves performance markedly in cluttered environments typical of this scenario. Furthermore, because OAM does not occur in nature, its existence is typically easier to discriminate from clutter.

Figure 13A:
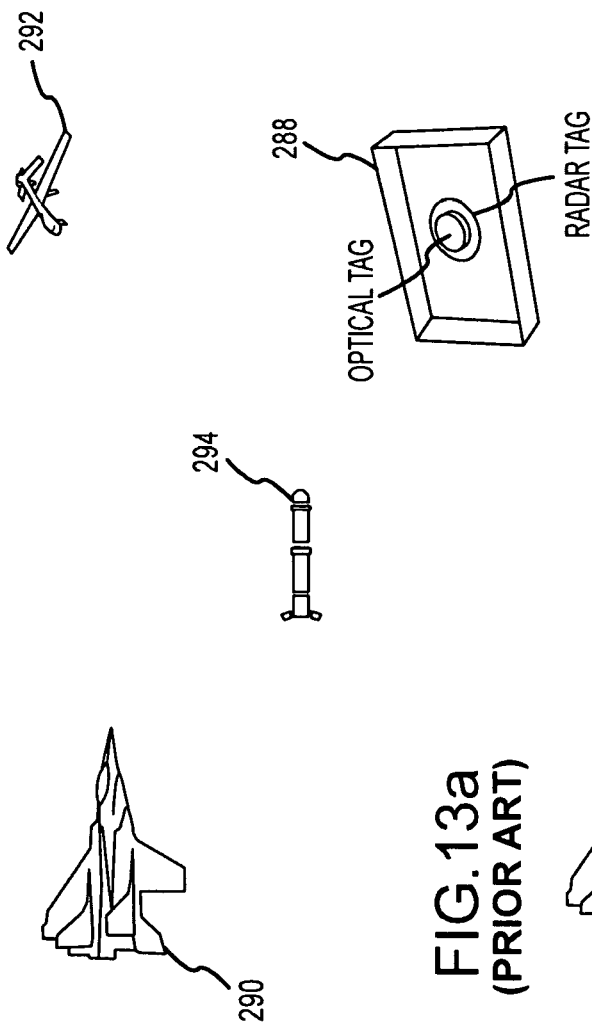
FIGS. 13a and 13b are diagrams of a known RF/EO and an RF/EO OAM passive tagging weapon system, respectively.
Figure 13B:
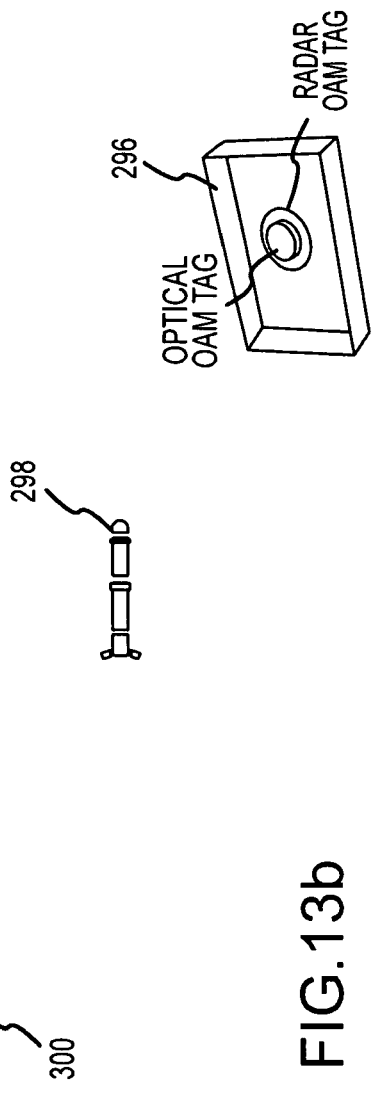

The OAM degree of freedom can be combined with signal processing capabilities for target prosecution to form an integrated system for simultaneously performing the tagging and target prosecution functions. In this scenario 'friendly' aircraft (not shown) would be provided with an EO/RF tag 288. FIG. 13a shows an extant system for performing RF/EO tagging and target engagement such as one or more of target detection, target discrimination, clutter cancellation and interference mitigation. Here the RF/EO tagging functions are performed by the weapon launch 290 and/or surveillance 292 platforms, while the target prosecution is performed by the launched weapon 294. The state-of-the-art for the excitation laser and tag is to exploit a highly-forbidden optical process. The excitation laser for tagging and the laser for target prosecution are not compatible for integration into a single laser. Furthermore, polarization coding does not perform well in the cluttered environments (scenes) typical of these scenarios. FIG. 13b shows how the RF/EO tagging capability can be implemented on the launched weapon by adding the OAM degree of freedom to the organic RF/EO sensors. A second laser source for the excitation laser is not required. In this case, an OAM tag (EO and/or RF) 296 is placed on friendly aircraft. The active EO and/or RF source on the launched weapon 298 is configured to generate the prescribed OAM state and receive and decode the OAM states in the returned beam to identify the object as friend or foe. The launch platform 300 is not involved in the tagging function and a surveillance platform is not required. The higher dimensionality of OAM diversity improves performance markedly in cluttered environments typical of this scenario. Furthermore, because OAM does not occur in nature, its existence is typically easier to discriminate from clutter.

Multi-Mode RF OAM and EO OAM Tagging

Figure 14B:
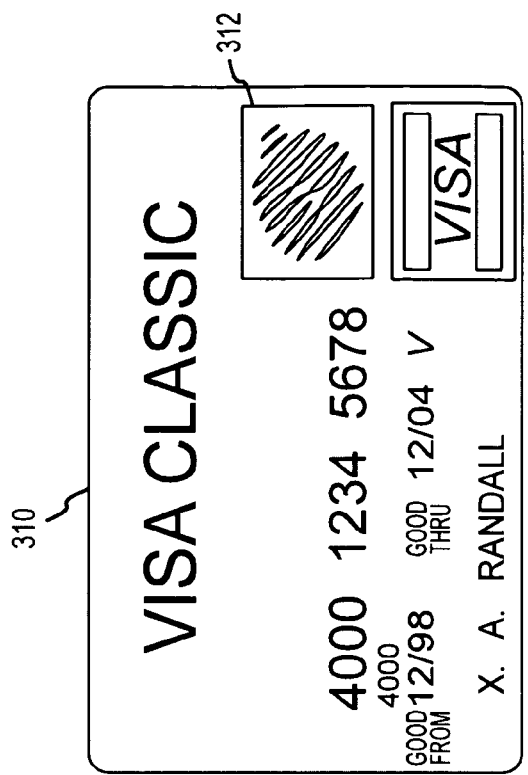
FIGS. 14a, 14b and 14c are diagrams of a dual-mode RF OAM and EO OAM card reader.
Figure 14C:
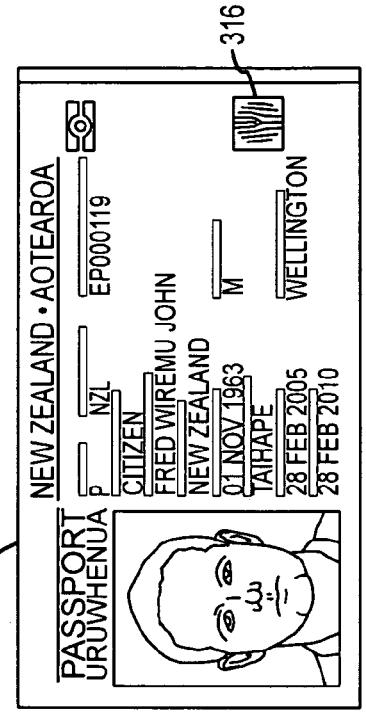
Figure 14A:
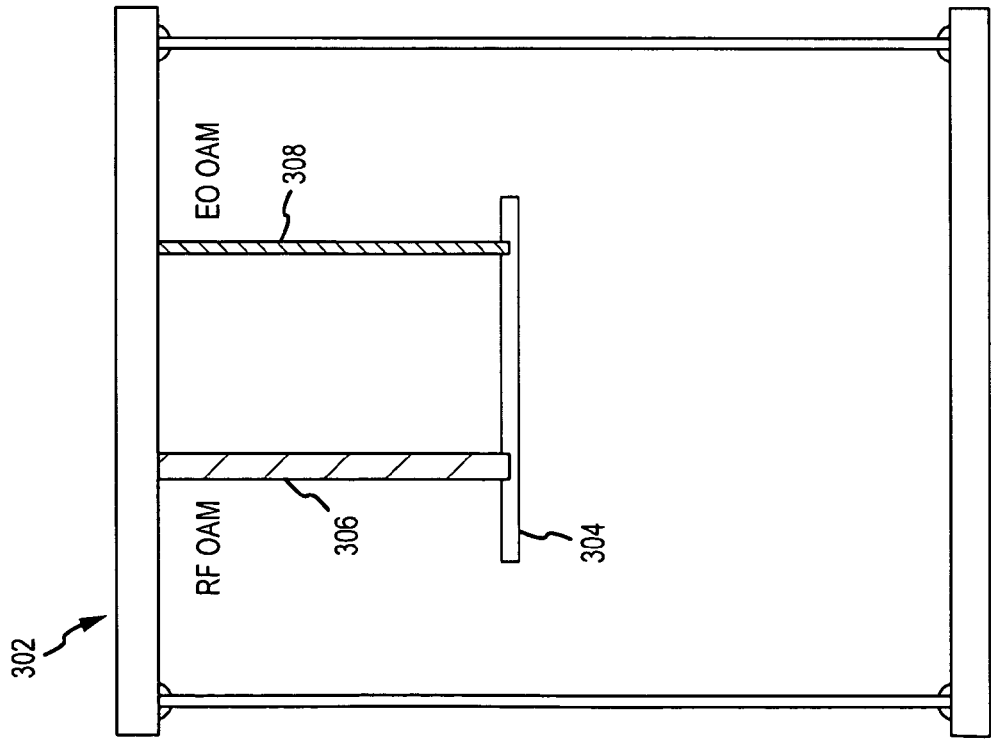

In some applications, it may be desirable to use multi-mode tagging either for increased security and capability or to accommodate different types of OAM tags. One such example is a secure card reader for reading credit cards and passports. FIG. 14a shows a representative mechanical structure and key components for the reader 302. The configuration of the insertion slot 304 that positionally constrains the tag to be normal to the incident RF and EO OAM beams 306 and 308 ensures that the OAM readers will always lie in the direct return path of the OAM return beams. This prevents "eavesdropping," a current privacy/security concern for RFID-enabled passports and contactless credit/debit cards. Both EO and RF capabilities are included to cover the two primary current approaches to adding security features to card readers: holograms (EO) and RFID (RF). FIG. 14b shows the hologram currently incorporated on a credit/debit card 310 replaced by an OAM reflective computer generated hologram (CGH) 312. FIG. 14c shows planned RFID tag on a passport/badge 314 replaced by an OAM RF grating 316. In this type of application, the OAM tag includes a hologram or grating that not only matches the prescribed state of the source beam so that only the reader can read the return beam, but also preferably uniquely identifies the credit card or passport, for example as a key for encryption purposes. Credit card and passport readers may be implemented in a single-mode configuration as well. Contactless credit/debit card readers allow a user to scan their card without inserting it into the insertion slot. Although contactless readers are user friendly they do increase the concerns of potential eavesdropping. The requirement imposed by OAM that the reader lie in the direct return path greatly reduces concerns over eavesdropping.

Temporally Agile OAM Tagging

The feature of "temporal agility" in either the OAM tag or the OAM source and tag may prove to be a highly desirable feature for both increased security and flexibility to code additional information about the tagged target or object. The availability of rapidly tunable optical elements makes this proposal much more attractive for EO OAM beams. Fundamentally, a hologram takes any given field to any other, so it is possible to generate an output beam having arbitrary OAM components with a single properly designed CGH. A SLM can be configured to provide a dynamic CGH that varies the transformation of the OAM components with time or a changing state.

Figure 15A:
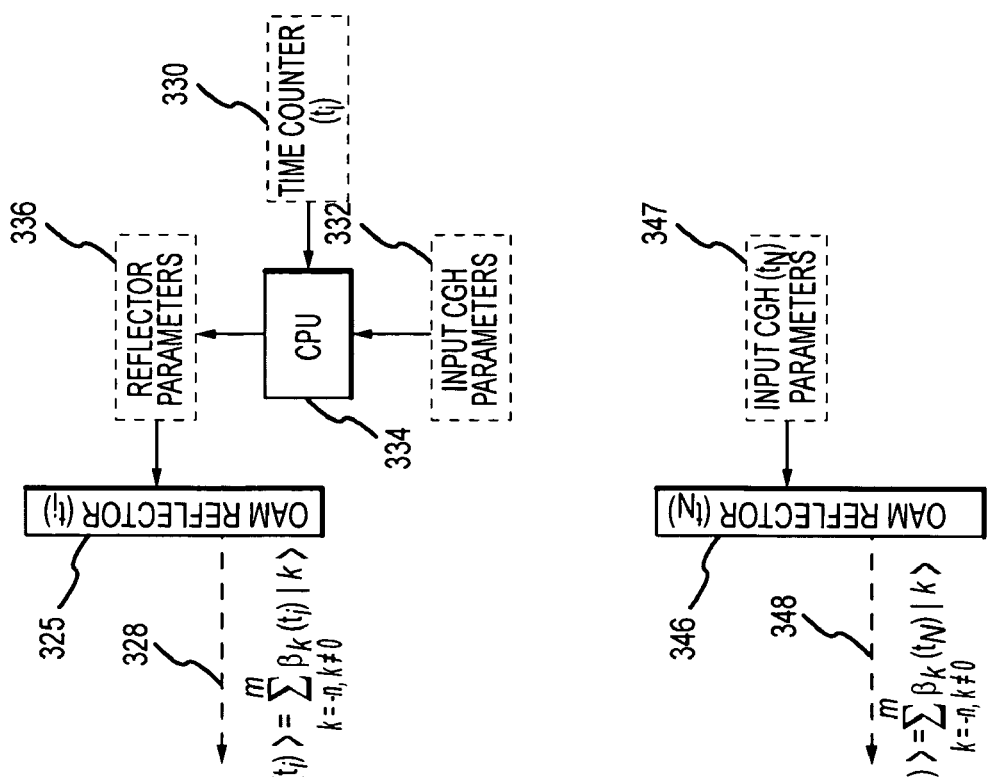
FIGS. 15a and 15b are diagrams of a dynamic OAM reflector having temporal agility and an agile OAM source with matched OAM reflector.

FIG. 15a illustrates a realization where the source 320 and OAM generator 322 produce a time-independent beam 324 having a prescribed state of non-zero OAM components. The CGH 325 generates a time-dependent return OAM beam 328 in response. With knowledge of the OAM content of the source EO beam, a reflective hologram 325 can be designed to return an EO beam whose OAM content has been changed in a well prescribed manner. This reflective hologram can produce different return EO beams from the same input EO beam by changing the reflective CGM design. This temporal agility is made explicit in $\Psi_{reflected}(t_i)$. A time counter 330 and input CHG parameters 332 are provided to a CPU 334 that recomputes reflection parameters 336 for CGH 325. The input CHG parameters may be derived from an embedded security code or may, for example, reflect temporally changing characteristics of the target or surrounding environment. Unlike polarization, there can be many non-zero OAM states that provide large diversity/dimensionality in which to encode different information.

Figure 15B:
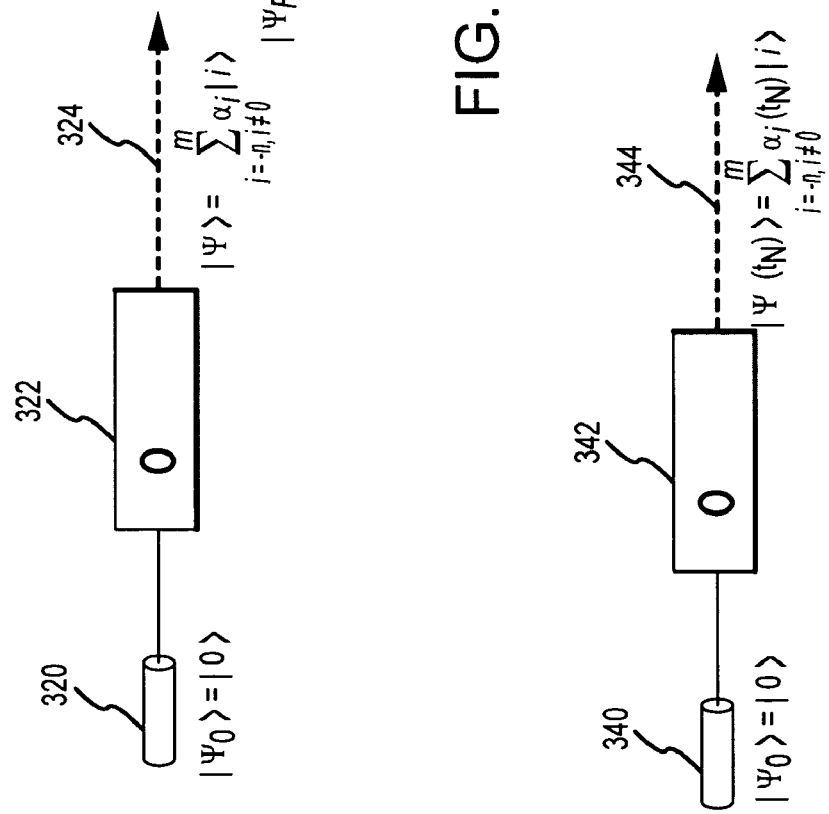

FIG. 15b shows an alternative mechanism for introducing temporal agility. In this case the goal is increased security by changing the prescribed state of the source beam and the OAM tag in synchrony so that they remain matched. A source 340 and OAM generator 342 produce a time-dependent beam 344 in which the prescribed state changes with time. The CGH inside the generator is updated at each time instance in accordance with an algorithm to generate the multiple output EO OAM beams $[\Psi(t_1), \ldots, \Psi(t_N)]$. With knowledge of the prescribed state of the transmitted EO beam at a given time, a reflective SLM 346 can be reconfigured using input CGH(tn) parameters 347 to implement a dynamic CGH that reflects an EO beam 348 with a different prescribed state that maintains the desired transformation. In other words, the source and tag CGHs are synchronized so that the transformation of the OAM components is unaffected by the time coding. The requisite "knowledge" of the time sequence of prescribed states may be transmitted in the beam itself or pre-stored in the OAM tag. Limited temporal agility can be introduced in RF OAM beams by selecting from multiple stored prefabricated OAM gratings rather than CGH and reflective holograms.

OAM Signal Character not Controlled

While there are undoubtedly other compelling defense signal processing applications well suited to OAM light, one promising line of investigation centers on treating OAM as an additional waveform degree of freedom (similar to polarization, frequency, etc.). It does not matter that the return signal has a well-defined OAM but rather that there is a significant difference between man-made objects and natural clutter. Numerous modern sensors are now designed to be fully polarimetric and sophisticated waveform design and scheduling algorithms have been developed. The recent results on the generation of millimeter-wave beams with phase singularities indicate that high-dimensional multi-mode radars are a very real possibility. This application is clearly non-cooperative in nature. The target is 'untagged' and the OAM source beam is reflected off of the man-made target and natural clutter.

OAM-Diverse Radar System

Figure 16:
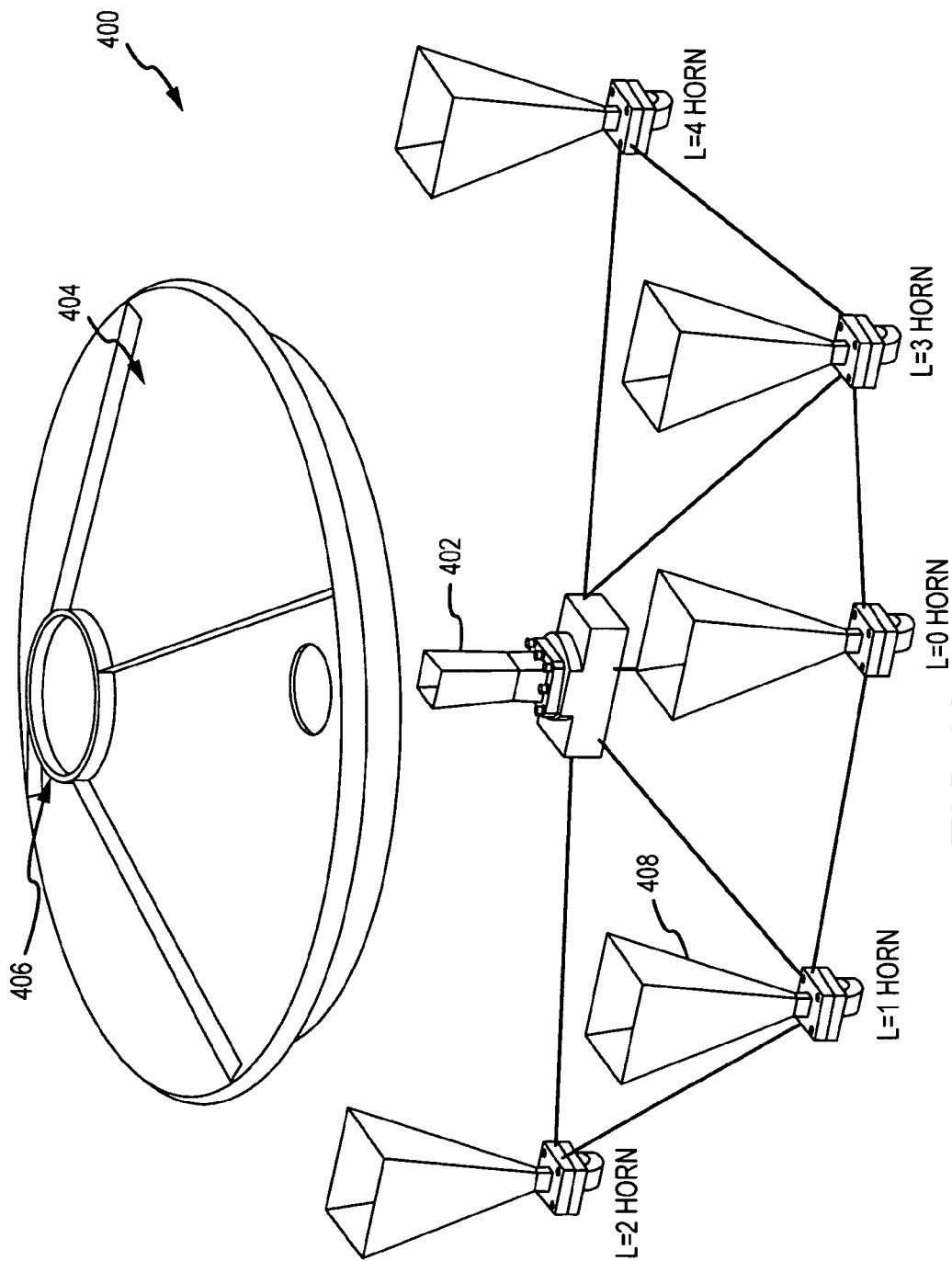
FIG. 16 is an OAM diverse radar antenna.

FIG. 16 illustrates a notional design of an OAM-diverse radar antenna 400. This design is based on extant polarization-diverse RF reflector antennas, in which there are typically two horns with orthogonal polarization. These are then selected and sent to the antenna feed 402 for transmission via a dish 404 and reflector 406. An OAM antenna has multiple horns 408 depending on the number of available OAM RF beams that are multiplexed in time and sent to the antenna feed. Each horn is configured for a different single OAM state L=0, 1, 2, 3 and 4. Because an OAM RF beam can be generated independently of polarization (photon spin and orbital angular momentum effectively decouple), it is possible to build OAM diversity on top of polarization diversity. In an alternate embodiment, there could be a single horn in which the beam has multiple non-zero states. In another alternate embodiment, there could be a single horn in which the transmitted beam has only one non-zero state at a particular time but that state is temporally agile. The availability of multiple OAM states (albeit in multiplexed beams), a single temporally agile beam or a single beam having multiple OAM states provides greater diversity than conventional polarization diversity, particularly when built on top of the polarization diversity system.

Figure 17A:
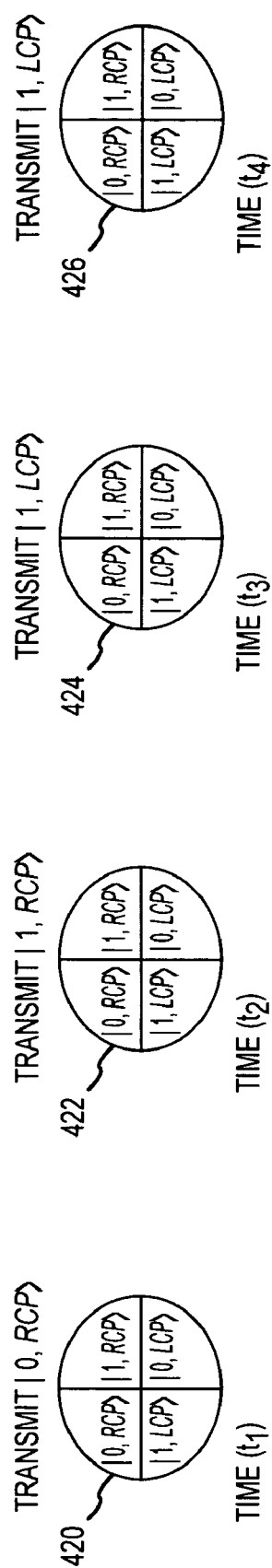
FIGS. 17a and 17b are diagrams of the time sequence of emitted and returned RF OAM signals.
Figure 17B:
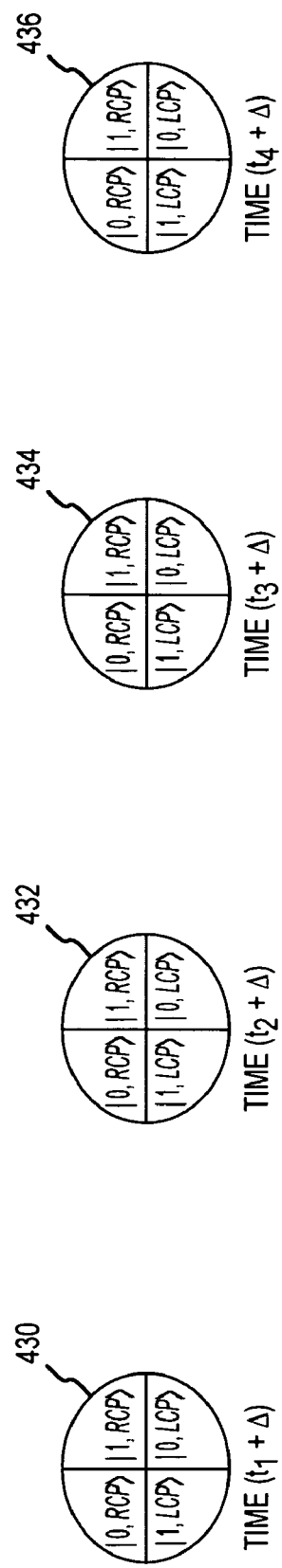

FIGS. 17a and 17b show one realization of how the OAM-diverse radar antenna 400 of FIG. 16 is used in practice. The operational concept is a straightforward extension of polarization space time adaptive array processing (P-STAP). P-STAP exploits the fact that man-made objects and clutter typically respond quite differently to a polarized RF signal. This difference can be used to separate targets from background clutter. Multiple OAM states, taken either alone or on top of polarization diversity, provide greater degrees of freedom and hence better opportunity to differentiate target from clutter for detection, identification, tracking, aimpoint selection etc. FIG. 17a describes an operational method of transmission—a fast time sequence of the four available OAM RF signals 420, 422, 424 and 426. As shown in FIG. 17b, these transmitted signals, which are reflected from an observed scene, are received as signals 430, 432, 434 and 436 after a total transit time, Δ. The received data can be processed using an extension of conventional P-STAP processing: $X(X^*X)^{-1} = YY^*$, where X is received data and Y is the estimated data.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An apparatus, comprising:
   an orbital angular momentum (OAM) source comprising an electromagnetic (EM) source that generates an electromagnetic beam in an initial state having zero orbital angular momentum (OAM) and a first diffractive element that converts the beam into a source beam having a prescribed source state with one or more non-zero OAM components;
   a tag comprising a second diffractive element on a friendly hard target, said tag matched to said OAM source to reflect the source beam to transform the non-zero OAM components of the prescribed source state to a different prescribed return state in a return beam; and
   a receiver that measures the OAM components of the return beam and with knowledge of the prescribed source state of the source beam and the transformation implemented by the OAM tag compares the measured OAM components to the nonzero OAM components of the prescribed source state to identify the tag.

2. The apparatus of claim 1, wherein said receiver measures a non-OAM property of the return beam.

3. The apparatus of claim 2, wherein said electromagnetic beam has a prescribed polarization, said tag reflecting the source beam to control the polarization of the return beam, said receiver measuring the polarization of the return beam.

4. The apparatus of claim 2, wherein said electromagnetic beam is a laser beam, said receiver computing the range to the tag from the measured non-OAM property.

5. The apparatus of claim 2, wherein said electromagnetic beam is an RF beam, said receiver performing target engagement functions from the measured non-OAM property.

6. The apparatus of claim 1, wherein said first diffractive element produces multiple non-zero OAM components.

7. The apparatus of claim 1, wherein the electromagnetic beam is an electro-optic (EO) beam, said first diffractive element comprising a computer generated hologram that is regenerated to change the non-zero OAM components of the source beam in a time sequence, said tag's second diffractive element comprising a computer generated hologram that is regenerated synchronously with the source beam.

8. The apparatus of claim 1, wherein the electromagnetic beam is a radio-frequency (RF) beam, said first diffractive element comprising multiple different prefabricated gratings that are selected in sequence to change the non-zero OAM components of the source beam in a time sequence, said tag's second diffractive element comprising a like sequence of gratings that are selected synchronously with the source beam.

9. The apparatus of claim 1, wherein the electromagnetic beam is an EO beam, said first and second diffractive elements comprising holograms.

10. The apparatus of claim 1, wherein the electromagnetic beam is an RF beam, said first and second diffractive elements comprising gratings.

11. The apparatus of claim 1, wherein said second diffractive element is configured as a retro-reflector to reflect the return beam back along a direct return path to the receiver.

12. The apparatus of claim 1, wherein said second diffractive element is a static physical element.

13. The apparatus of claim 12, wherein said tag comprises a plurality of second diffractive elements that are associated with different source beams having different prescribed source states.

14. The apparatus of claim 1, wherein said tag's second diffractive element comprises a computer generated hologram (CGH) that is temporally agile.

15. The apparatus of claim 14, wherein a spatial light modulator (SLM) is configured to provide the temporally agile CGH.

16. The apparatus of claim 14, wherein said CGH changes to present a sequence of different holograms associated with different source beams having different known prescribed source states.

17. The apparatus of claim 14, wherein said CGH changes to present a sequence of different holograms synchronized to changes in the one or more OAM components of the prescribed source state of the source beam.

18. The apparatus of claim 14, wherein said CGH changes to present different holograms to impart information in addition to the tag identification onto the OAM components of the return beam.

19. The apparatus of claim 1, wherein the receiver comprises:
   an interferometric device that separates the non-zero OAM components, and
   a processor that processes the components to determine the corresponding weights of the OAM components and to identify the optical tag.

20. The apparatus of claim 1, wherein the receiver lies in a direct return path of the return beam.

21. The apparatus of claim 20, wherein said tag is configured as a retro-reflector to reflect the return beam back along the direct return path.

22. The apparatus of claim 20, wherein the tag is positionally constrained approximately normal to the incident source beam to reflect the return beam along the direct return path to the receiver.

23. An apparatus comprising:
   a source that generates an electromagnetic beam in an initial state having zero orbital angular momentum (OAM);
   a first diffractive element that converts the beam into a source beam having a prescribed source state with one or more non-zero OAM components;
   a tag that reflects the source beam to control the non-zero OAM components in a return beam, wherein said tag comprises a second diffractive element that alters the one or more non-zero OAM components of the prescribed source state in a known manner; and
   a receiver that measures the OAM components of the return beam and compares the measured OAM components to the nonzero OAM components of the prescribed source state to identify the tag,
   wherein the tag is matched to the prescribed source state of the source beam such that for any deviations from the prescribed source state the OAM components in the return beam are unintelligible to the receiver.

24. An apparatus, comprising:
a source that generates an electromagnetic source beam having a prescribed source state with one or more non-zero OAM components;
a tag that reflects the source beam to transform the non-zero OAM components to a different prescribed return state in a return beam; and
a receiver in a direct return path that approximately retraces the source path, said receiver measures the OAM components of the return beam and with knowledge of the prescribed source state of the source beam and the transformation implemented by the OAM tag compares the measured OAM to the non-zero OAM components of the prescribed source state to identify the tag, wherein the tag is matched to the prescribed source state of the source beam such that for any deviations from the prescribed source state the OAM components in the return beam are unintelligible to the receiver.

25. The apparatus of claim 24, wherein the electromagnetic beam is a radio-frequency (RF) beam, said first diffractive element comprising multiple different prefabricated gratings that are selected in sequence to change the non-zero OAM components of the source beam in a time sequence, said tag's temporally agile second diffractive element comprising a like sequence of gratings that are selected synchronously with the source beam.

26. An apparatus, comprising:
a plurality of sources that generate RF beams in an initial state having zero orbital angular momentum (OAM);
a plurality of diffractive elements that convert respective beams passing there through into source beams each having a different prescribed source state with one or more non-zero OAM components;
a multiplexer that multiplexes the source beams into a time sequence;
an antenna that transmits the multiplexed source beam, said multiplexed source beam reflected off a target in a background to produce a return beam in which the OAM components are altered differently by the target and background; and
a receiver in the directed reflected path of the return beam that measures the one or more OAM components of the return beam and processes the alterations of the OAM components from the different prescribed source states to discriminate the target from the background.

27. The apparatus of claim 26, wherein said sources generate the RF beams with polarization diversity, said receiver measuring and processing the altered polarization in the return beam.

28. The apparatus of claim 26, wherein the diffractive element converts the beam into a source beam having multiple non-zero OAM components.

29. An apparatus, comprising:
a source that generates a radio frequency (RF) beam in an initial state having zero orbital angular momentum (OAM);
a plurality of different diffractive elements selected in sequence that convert the RF beam into a temporally-agile source beam having a temporally-agile prescribed source state with one or more non-zero OAM components that change with the selection of each said diffractive element, said temporally-agile source beam reflected off a target in a background to produce a temporally-agile return beam in which the OAM components are altered differently by the target and background; and
a receiver in the directed reflected path of the return beam that measures the one or more OAM components of the temporally-agile return beam and processes the alterations of the OAM components from the prescribed source state to discriminate the target from the background.

* * * * *